United States Patent
Lu

(10) Patent No.: US 10,248,690 B1
(45) Date of Patent: Apr. 2, 2019

(54) DECREMENTAL CORRELATION CALCULATION FOR BIG DATA OR STREAMED DATA USING COMPONENTS

(71) Applicant: Jizhu Lu, Redmond, WA (US)

(72) Inventor: Jizhu Lu, Redmond, WA (US)

(73) Assignee: CLOUD & STREAM GEARS LLC, Redmond, WA (US)

( * ) Notice: Subject to any disclaimer, the term of this patent is extended or adjusted under 35 U.S.C. 154(b) by 462 days.

(21) Appl. No.: 14/964,376

(22) Filed: Dec. 9, 2015

Related U.S. Application Data

(60) Provisional application No. 62/089,251, filed on Dec. 9, 2014.

(51) Int. Cl.
*G06F 17/18* (2006.01)
*G06F 17/30* (2006.01)

(52) U.S. Cl.
CPC ........ *G06F 17/30442* (2013.01); *G06F 17/18* (2013.01)

(58) Field of Classification Search
CPC ......... G06F 17/30463; G06F 17/30395; G06F 17/30306
USPC ....................................................... 707/719
See application file for complete search history.

(56) References Cited

U.S. PATENT DOCUMENTS

| 7,747,413 | B2 | 6/2010 | Ramsey et al. | |
|---|---|---|---|---|
| 7,840,377 | B2 | 11/2010 | Ramsey et al. | |
| 9,069,726 | B2 * | 6/2015 | Lu | H04L 65/60 |
| 9,430,444 | B2 * | 8/2016 | Lu | H04L 65/60 |
| 2014/0164456 | A1 * | 6/2014 | Lu | G06F 17/18 |
| | | | | 708/200 |

FOREIGN PATENT DOCUMENTS

WO  WO-2014093540 A2  6/2014
WO  WO-2014093540 A3  9/2014

* cited by examiner

*Primary Examiner* — Jean B Fleurantin

(57) ABSTRACT

The present invention extends to methods, systems, and computing system program products for decrementally calculating correlation for Big Data or streamed data. Embodiments of the invention include decrementally calculating one or more components of a correlation for two modified computation subsets based on one or more components of the correlation calculated for two previous computation subsets and then calculating the correlation for the modified computation subsets based on the decrementally calculated components. Decrementally calculating the components of a correlation avoids visiting all data elements in the modified computation subsets and performing redundant computations thereby increasing calculation efficiency, saving computation resources, and reducing computing system's power consumption.

20 Claims, 32 Drawing Sheets

The Definition of Correlation:

Suppose there is a computation subset $X$ composed of $n$ data elements: $X = \{x_i | i = 1, \ldots, n\}$ and a computation subset $Y$ composed of $n$ data elements: $Y = \{y_i | i = 1, \ldots, n\}$.

Define the sums of $X$ and $Y$ in the k$^{th}$ iteration respectively as below:

$XS_k = x_1 + x_2 + x_3 + \cdots + x_n = \sum_1^n x_i$ ⌒⌒401

$YS_k = y_1 + y_2 + y_3 + \cdots + y_n = \sum_1^n y_i$ ⌒⌒402

Define the means of the $X$ and $Y$ in the k$^{th}$ iteration respectively as below:

$\bar{x}_k = \frac{(x_1+x_2+x_3+\cdots+x_n)}{n} = \frac{\sum_1^n x_i}{n}$ ⌒⌒403

$\bar{y}_k = \frac{(y_1+y_2+y_3+\cdots+y_n)}{n} = \frac{\sum_1^n y_i}{n}$ ⌒⌒404

The correlation of $X$ and $Y$ in the k$^{th}$ iteration is defined as:

$\rho_k = \frac{\sum_1^n (x_i - \bar{x}_k)(y_i - \bar{y}_k)}{\sqrt{\sum_1^n (x_i - \bar{x}_k)^2 \sum_1^n (y_i - \bar{y}_k)^2}}$ ⌒⌒405

Suppose $\rho_k$ has already been calculated, and the correlation of the two computation subsets needs to be calculated again after after an existing data element $x_r$ $(1 \leq r \leq n)$ is removed from $X$ and an existing data element $y_r$ $(1 \leq r \leq n)$ is removed from $Y$.

Define the sums and means of the adjusted $X$ with size $n - 1$ and $Y$ with size $n - 1$ respectively in the k+1$^{th}$ iteration as below:

$XS_{k+1} = x_1 + x_2 + x_3 + \cdots + x_n - x_r = \sum_1^n x_i - x_r$ ⌒⌒406

$YS_{k+1} = y_1 + y_2 + y_3 + \cdots + y_n - y_r = \sum_1^n y_i - y_r$ ⌒⌒407

$\bar{x}_{k+1} = \frac{(x_1+x_2+x_3+\cdots+x_n-x_r)}{n-1} = \frac{\sum_1^n x_i - x_r}{n-1}$ ⌒⌒408

$\bar{y}_{k+1} = \frac{(y_1+y_2+y_3+\cdots+y_n-y_r)}{n-1} = \frac{\sum_1^n y_i - y_r}{n-1}$ ⌒⌒409

The correlation of the adjusted computation subsets $X$ and $Y$ in the k+1$^{th}$ iteration is defined as:

$\rho_{k+1} = \frac{\sum_1^n (x_i - \bar{x}_{k+1})(y_i - \bar{y}_{k+1}) - (x_r - \bar{x}_{k+1})(y_r - \bar{y}_{k+1})}{\sqrt{(\sum_1^n (x_i - \bar{x}_{k+1})^2 - (x_r - \bar{x}_{k+1})^2)(\sum_1^n (y_i - \bar{y}_{k+1})^2 - (y_r - \bar{y}_{k+1})^2)}}$ ⌒⌒410

Fig. 4A

Some Example Components of Correlation:

A component of a correlation is a quantity or expression appearing in a correlation's definition equation or any transforms of the definition equation. The following are a few example components of a correlation.

- $XS_k = \sum_1^n x_i$
- $YS_k = \sum_1^n y_i$
- $\bar{x}_k = \frac{1}{n}\sum_1^n x_i$
- $\bar{y}_k = \frac{1}{n}\sum_1^n y_i$
- $XSS_k = \sum_1^n x_i^2$
- $YSS_k = \sum_1^n y_i^2$
- $SSDX_k = \sum_1^n (x_i - \bar{x}_k)^2$
- $SSDY_k = \sum_1^n (y_i - \bar{y}_k)^2$
- $SDXY_k = \sum_1^n (x_i - \bar{x}_k)(y_i - \bar{y}_k)$
- $SXY_k = \sum_1^n x_i y_i$
- $RSSDX_k = \sqrt{\sum_1^n (x_i - \bar{x}_k)^2}$
- $RSSDY_k = \sqrt{\sum_1^n (y_i - \bar{y}_k)^2}$
- $RSDXY_k = \sqrt{\sum_1^n (x_i - \bar{x}_k)^2 \sum_1^n (y_i - \bar{y}_k)^2}$
- $x\sigma_k = \sqrt[2]{\frac{\sum_1^n x_i^2}{n} - \bar{x}_k^2}$
- $y\sigma_k = \sqrt[2]{\frac{\sum_1^n y_i^2}{n} - \bar{y}_k^2}$
- $\rho_k = \frac{\sum_1^n (x_i - \bar{x}_k)(y_i - \bar{y}_k)}{\sqrt[2]{\sum_1^n (x_i - \bar{x}_k)^2 \sum_1^n (y_i - \bar{y}_k)^2}}$ Basic Decremental Component Calculation Equations:

The sum and/or mean of the data elements in previous data sets will be used by several examples of decremental algorithms described in the following sections, so the equations are put here instead of in each algorithms.

According to the definitions of $XS_{k+1}, YS_{k+1}, \bar{x}_{k+1}$ and $\bar{y}_{k+1}$, they can be calculated in an decremental way:

$XS_{k+1} = XS_k - x_r$ \quad 411

$YS_{k+1} = YS_k - y_r$ \quad 412

$\bar{x}_{k+1} = \frac{XS_{k+1}}{n-1} = \frac{(n\bar{x}_k - x_r)}{n-1}$ \quad 413

$\bar{y}_{k+1} = \frac{YS_{k+1}}{n-1} = \frac{(n\bar{y}_k - y_r)}{n-1}$ \quad 414

Fig. 4B

Decremental Algorithm 1:

Correlation can be decrementally calculated based on the components $XS_{k+1}$ or $\bar{x}_{k+1}$ and $YS_{k+1}$ or $\bar{y}_{k+1}$ defined in Figure 4A and Figure 4B and the $SXY_{k+1}$, $x\sigma_{k+1}$ and $y\sigma_{k+1}$ defined below.

$$XSS_k = \sum_1^n x_i^2 \qquad \text{415}$$

$$XSS_{k+1} = \sum_1^n x_i^2 - x_r^2 \qquad \text{416}$$

$XSS_{k+1}$ can be calculated in a decremental way:

$$XSS_{k+1} = XSS_k - x_r^2 \qquad \text{417}$$

$$x\sigma_k = \sqrt[2]{\frac{XSS_k}{n} - \left(\frac{XS_k}{n}\right)^2} = \sqrt[2]{\frac{XSS_k}{n} - \bar{x}_k^2} \qquad \text{418}$$

$$x\sigma_{k+1} = \sqrt[2]{\frac{XSS_{k+1}}{n+1} - \left(\frac{XS_{k+1}}{n+1}\right)^2} = \sqrt[2]{\frac{XSS_{k+1}}{n-1} - \bar{x}_{k+1}^2} \qquad \text{419}$$

$$YSS_k = \sum_1^n y_i^2 \qquad \text{420}$$

$$YSS_{k+1} = \sum_1^n y_i^2 - y_r^2 \qquad \text{421}$$

$YSS_{k+1}$ can be calculated in a decremental way:

$$YSS_{k+1} = YSS_k - y_r^2 \qquad \text{422}$$

$$y\sigma_k = \sqrt[2]{\frac{YSS_k}{n} - \left(\frac{YS_k}{n}\right)^2} = \sqrt[2]{\frac{YSS_k}{n} - \bar{y}_k^2} \qquad \text{423}$$

$$y\sigma_{k+1} = \sqrt[2]{\frac{YSS_{k+1}}{n+1} - \left(\frac{YS_{k+1}}{n+1}\right)^2} = \sqrt[2]{\frac{YSS_{k+1}}{n-1} - \bar{y}_{k+1}^2} \qquad \text{424}$$

$$SXY_k = \sum_1^n x_i y_i \qquad \text{425}$$

$$SXY_{k+1} = \sum_1^n x_i y_i - x_r y_r \qquad \text{426}$$

$SXY_{k+1}$ can be calculated in a decremental way:

$$SXY_{k+1} = SXY_k - x_r y_r \qquad \text{427}$$

Once $XS_{k+1}$ or $\bar{x}_{k+1}$, $YS_{k+1}$ or $\bar{y}_{k+1}$, $SXY_{k+1}$, $x\sigma_{k+1}$, and $y\sigma_{k+1}$ are calculated, then correlation defined in equation 410 can be calculated by $$\rho_{k+1} = \frac{(SXY_{k+1} - YS_{k+1}\bar{x}_{k+1})}{(n-1) \cdot x\sigma_{k+1} \cdot y\sigma_{k+1}} = \frac{(SXY_{k+1} - \bar{y}_{k+1} XS_{k+1})}{(n-1) \cdot x\sigma_{k+1} \cdot y\sigma_{k+1}} = \frac{(SXY_{k+1} - YS_{k+1} XS_{k+1}/(n-1))}{(n-1) \cdot x\sigma_{k+1} \cdot y\sigma_{k+1}} = \frac{(SXY_{k+1} - (n-1)\bar{y}_{k+1}\bar{x}_{k+1})}{(n-1) \cdot x\sigma_{k+1} \cdot y\sigma_{k+1}}$$

Decremental Algorithm 2:

$$SSDX_k = \sum_1^n (x_i - \bar{x}_k)^2 \qquad \sim\!\!\_429$$

$$SSDX_{k+1} = \sum_1^n (x_i - \bar{x}_{k+1})^2 - (x_r - \bar{x}_{k+1})^2 \qquad \sim\!\!\_430$$

$SSDX_{k+1}$ can be calculated in a decremental way using $XS_k$ or $\bar{x}_k$ and $XS_{k+1}$ or $\bar{x}_{k+1}$:

$$SSDX_{k+1} = SSDX_k - (x_r - XS_{k+1}/(n-1))(x_r - XS_k/n) = SSDX_k - (x_r - \bar{x}_{k+1})(x_r - \bar{x}_k)$$

$$\sim\!\!\_431$$

$$SSDY_k = \sum_1^n (y_i - \bar{y}_k)^2 \qquad \sim\!\!\_432$$

$$SSDY_{k+1} = \sum_1^n (y_i - \bar{y}_{k+1})^2 - (y_r - \bar{y}_{k+1})^2 \qquad \sim\!\!\_433$$

$SSDY_{k+1}$ can be calculated in a decremental way using $YS_k$ or $\bar{y}_k$ and $YS_{k+1}$ or $\bar{y}_{k+1}$:

$$SSDY_{k+1} = SSDY_k - (y_r - YS_{k+1}/(n-1))(y_r - YS_k/n) = SSDY_k - (y_r - \bar{y}_{k+1})(y_r - \bar{y}_k)$$

$$\sim\!\!\_434$$

$$SDXY_k = \sum_1^n (x_i - \bar{x}_k)(y_i - \bar{y}_k) \qquad \sim\!\!\_435$$

$$SDXY_{k+1} = \sum_1^n (x_i - \bar{x}_{k+1})(y_i - \bar{y}_{k+1}) - (x_r - \bar{x}_{k+1})(y_r - \bar{y}_{k+1}) \qquad \sim\!\!\_436$$

$SDXY_{k+1}$ can be calculated in a decremental way using $SDXY_k$, $XS_{k+1}$ or $\bar{x}_{k+1}$ and $YS_{k+1}$ or $\bar{y}_{k+1}$:

$$SDXY_{k+1} = SDXY_k - \frac{((n-1)x_r - XS_{k+1})(y_r - \bar{y}_{k+1})}{n} = SDXY_k - \frac{(x_r - \bar{x}_{k+1})((n-1)y_r - YS_{k+1})}{n} = SDXY_k - \frac{(n-1)(x_r - \bar{x}_{k+1})(y_r - \bar{y}_{k+1})}{n}$$

$$\sim\!\!\_437$$

Once $SSDX_{k+1}$, $SSDY_{k+1}$ and $SDXY_{k+1}$ are calculated, then $$\rho_{k+1} = \frac{SDXY_{k+1}}{\sqrt[2]{SSDX_{k+1} SSDY_{k+1}}} \qquad \sim\!\!\_438$$

Fig. 4D

Decremental Algorithm 3:

Correlation is calculated based on components $XS_{k+1}$ or $\bar{x}_{k+1}$ and $YS_{k+1}$ or $\bar{y}_{k+1}$ defined in Figure 4A and Figure 4B and $XSS_{k+1}, YSS_{k+1}, SXY_{k+1}$ defined below.

$$XSS_k = \sum_1^n x_i^2 \qquad \qquad 439$$

$$XSS_{k+1} = \sum_1^n x_i^2 - x_r^2 \qquad 440$$

$XSS_{k+1}$ can be calculated in a decremental way:

$$XSS_{k+1} = XSS_k - x_r^2 \qquad 441$$

$$YSS_k = \sum_1^n y_i^2 \qquad \qquad 442$$

$$YSS_{k+1} = \sum_1^n y_i^2 - y_r^2 \qquad 443$$

$YSS_{k+1}$ can be calculated in a decremental way:

$$YSS_{k+1} = YSS_k - y_r^2 \qquad 444$$

$$SXY_k = \sum_1^n x_i y_i \qquad \qquad 445$$

$$SXY_{k+1} = \sum_1^n x_i y_i - x_r y_r \qquad 446$$

$SXY_{k+1}$ can be calculated in a decremental way:

$$SXY_{k+1} = SXY_k - x_r y_r \qquad 447$$

Once components $XS_{k+1}$ or $\bar{x}_{k+1}$, $YS_{k+1}$ or $\bar{y}_{k+1}$, $XSS_{k+1}$, $YSS_{k+1}$ and $SXY_{k+1}$ are calculated, then correlation defined in equation 410 can be calculated by $$\rho_{k+1} = \frac{SXY_{k+1} - XS_{k+1}\bar{y}_{k+1}}{\sqrt{(XSS_{k+1} - XS_{k+1}^2/(n-1))\cdot(YSS_{k+1} - (n-1)\bar{y}_{k+1}^2)}} = \frac{SXY_{k+1} - \bar{x}_{k+1}YS_{k+1}}{\sqrt{(XSS_{k+1} - (n-1)\bar{x}_{k+1}^2)\cdot(YSS_{k+1} - YS_{k+1}^2/(n-1))}} =$$

$$\frac{(n-1)SXY_{k+1} - XS_{k+1}YS_{k+1}}{\sqrt{((n-1)XSS_{k+1} - XS_{k+1}^2)\cdot((n-1)YSS_{k+1} - YS_{k+1}^2)}} = \frac{SXY_{k+1} - (n-1)\bar{x}_{k+1}\bar{y}_{k+1}}{\sqrt{(XSS_{k+1} - (n-1)\bar{x}_{k+1}^2)\cdot(YSS_{k+1} - (n-1)\bar{y}_{k+1}^2)}} \qquad 448$$

Fig. 4E

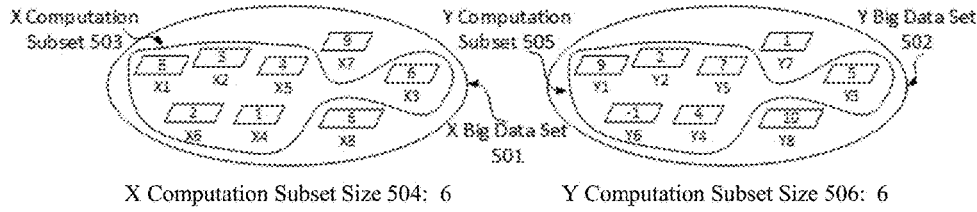

X Computation Subset Size 504: 6   Y Computation Subset Size 506: 6

Calculate Correlation for X Computation Subset 503 and Y Computation Subset 505

Traditional Algorithm:

1. Use equation 403 to calculate $\bar{x}_1$ and equation 404 to calculate $\bar{y}_1$ for the 1st iteration:

$$\bar{x}_1 = \frac{\sum_1^6 x_i}{6} = \frac{8+3+6+1+4+2}{6} = 4 \qquad \bar{y}_1 = \frac{\sum_1^6 y_i}{6} = \frac{9+2+5+4+7+(-1)}{6} = 4.3333333333333333$$

Operations in the two steps: 2 divisions, 10 additions

2. Calculate $\sum_1^6(x_i - \bar{x}_1)(y_i - \bar{y}_1)$ for the 1st iteration:

$\sum_1^6(x_i - \bar{x}_1)(y_i - \bar{y}_1) = (8 - 4)(9 - 4.3333333333333333) + (3 - 4)(2 - 4.3333333333333333) + (6 - 4)(5 - 4.3333333333333333) + (1 - 4)(4 - 4.3333333333333333) + (4 - 4)(7 - 4.3333333333333333) + (2 - 4)(-1 - 4.3333333333333333) = 34$ Operations in this step: 6 multiplications, 5 additions, 12 subtractions 3. Calculate $\sum_1^6(x_i - \bar{x}_1)^2$ for the 1st iteration:

$\sum_1^6(x_i - \bar{x}_1)^2 = (8 - 4)^2 + (3 - 4)^2 + (6 - 4)^2 + (1 - 4)^2 + (4 - 4)^2 + (2 - 4)^2 = 34$ Operations in this step: 6 multiplications, 5 additions, 6 subtractions 4. Calculate $\sum_1^6(y_i - \bar{y}_1)^2$ for the 1st iteration:

$\sum_1^6(y_i - \bar{y}_1)^2 = (9 - 4.3333333333333333)^2 + (2 - 4.3333333333333333)^2 + (5 - 4.3333333333333333)^2 + (4 - 4.3333333333333333)^2 + (7 - 4.3333333333333333)^2 + (-1 - 4.3333333333333333)^2 = 63.3333333333333334$ Operations in this step: 6 multiplications, 5 additions, 6 subtractions 5. Use equation 405 to calculate $\rho_1$ for the 1st iteration:

$$\rho_1 = \frac{\sum_1^6(x_i - \bar{x}_1)(y_i - \bar{y}_1)}{\sqrt[2]{\sum_1^6(x_i - \bar{x}_1)^2 \sum_1^6(y_i - \bar{y}_1)^2}} = \frac{34}{\sqrt[2]{34 \times 63.3333333333333334}} = 0.7326950970650465$$

Operations in this step: 1 square root, 1 division, 1 multiplication.

There are a total of 1 square root, 3 divisions, 19 multiplications, 25 additions and 24 subtractions.

Fig. 5A

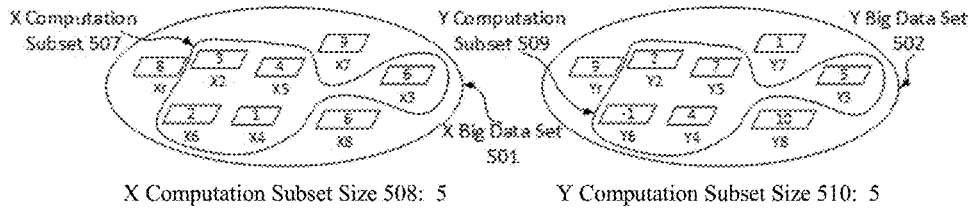

X Computation Subset Size 508: 5        Y Computation Subset Size 510: 5

Calculate Correlation for X Computation Subset 507 and Y Computation Subset 509

Traditional Algorithm:

1. Calculate the $\bar{x}_2$ and $\bar{y}_2$ for the 2$^{nd}$ iteration:

$$\bar{x}_2 = \frac{3+6+1+4+2}{5} = \frac{16}{5} = 3.2 \qquad \bar{y}_2 = \frac{2+5+4+7+(-1)}{5} = \frac{17}{5} = 3.4$$

Operations in the two steps: 2 divisions, 8 additions

2. Calculate $\sum_{2}^{6}(x_i - \bar{x}_2)(y_i - \bar{y}_2)$ for the 2$^{nd}$ iteration:

$$\sum_{2}^{6}(x_i - \bar{x}_2)(y_i - \bar{y}_2) = (3-3.2)(2-3.4) + (6-3.2)(5-3.4) + (1-3.2)(4-3.4) + (4-3.2)(7-3.4) + (2-3.2)(-1-3.4) = 11.6$$

Operations in this step: 5 multiplications, 4 additions, 10 subtractions

3. Calculate $\sum_{2}^{6}(x_i - \bar{x}_2)^2$ for the 2$^{nd}$ iteration:

$$\sum_{2}^{6}(x_i - \bar{x}_2)^2 = (3-3.2)^2 + (6-3.2)^2 + (1-3.2)^2 + (4-3.2)^2 + (2-3.2)^2 = 14.8$$

Operations in this step: 5 multiplications, 4 additions, 5 subtractions

4. Calculate $\sum_{2}^{6}(y_i - \bar{y}_2)^2$ for the 2$^{nd}$ iteration:

$$\sum_{2}^{6}(y_i - \bar{y}_2)^2 = (2-3.4)^2 + (5-3.4)^2 + (4-3.4)^2 + (7-3.4)^2 + (-1-3.4)^2 = 37.2$$

Operations in this step: 5 multiplications, 4 additions, 5 subtractions

5. Use equation 405 to calculate $\rho_2$ for the 2$^{nd}$ iteration:

$$\rho_2 = \frac{\sum_{2}^{6}(x_i-\bar{x}_2)(y_i-\bar{y}_2)}{\sqrt[2]{\sum_{2}^{6}(x_i-\bar{x}_2)^2 \sum_{2}^{6}(y_i-\bar{y}_2)^2}} = \frac{11.6}{\sqrt[2]{14.8 \times 37.2}} = 0.4943740446449421$$

Operations in this step: 1 square root, 1 division, 1 multiplication

There are a total of 1 square root, 3 divisions, 16 multiplications, 20 additions and 20 subtractions.

Fig. 5A Cont'd 1

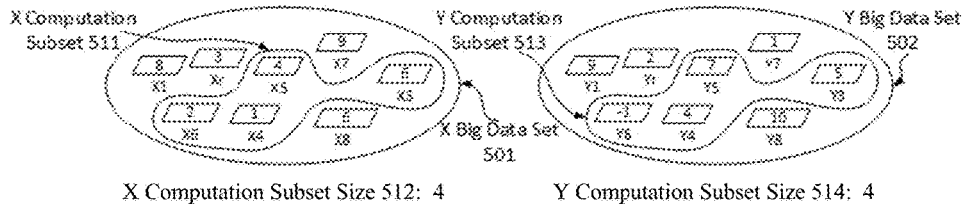

X Computation Subset Size 512: 4    Y Computation Subset Size 514: 4

Calculate Correlation for X Computation Subset 511 and Y Computation Subset 513

Traditional Algorithm:

1. Calculate the $\bar{x}_3$ and $\bar{y}_3$ for the $3^{rd}$ iteration:

$$\bar{x}_3 = \frac{6+1+4+2}{4} = \frac{13}{4} = 3.25 \qquad \bar{y}_3 = \frac{5+4+7+(-1)}{4} = \frac{15}{4} = 3.75$$

Operations in the two steps: 2 divisions, 6 additions

2. Calculate $\sum_3^6 (x_i - \bar{x}_3)(y_i - \bar{y}_3)$ for the $3^{rd}$ iteration:

$$\sum_3^6 (x_i - \bar{x}_3)(y_i - \bar{y}_3) = (6 - 3.25)(5 - 3.75) + (1 - 3.25)(4 - 3.75) + (4 - 3.25)(7 - 3.75) + (2 - 3.25)(-1 - 3.75) = 11.25$$

Operations in this step: 4 multiplications, 3 additions, 8 subtractions

3. Calculate $\sum_3^6 (x_i - \bar{x}_3)^2$ for the $3^{rd}$ iteration:

$$\sum_3^6 (x_i - \bar{x}_3)^2 = (6 - 3.25)^2 + (1 - 3.25)^2 + (4 - 3.25)^2 + (2 - 3.25)^2 = 14.75$$

Operations in this step: 4 multiplications, 3 additions, 4 subtractions

4. Calculate $\sum_3^6 (y_i - \bar{y}_3)^2$ for the $3^{rd}$ iteration:

$$\sum_3^6 (y_i - \bar{y}_3)^2 = (5 - 3.75)^2 + (4 - 3.75)^2 + (7 - 3.75)^2 + (-1 - 3.75)^2 = 34.75$$

Operations in this step: 4 multiplications, 3 additions, 4 subtractions

5. Use equation 405 to calculate $\rho_3$ for the $3^{rd}$ iteration:

$$\rho_3 = \frac{\sum_3^6 (x_i - \bar{x}_3)(y_i - \bar{y}_3)}{\sqrt[2]{\sum_3^6 (x_i - \bar{x}_3)^2 \sum_3^6 (y_i - \bar{y}_3)^2}} = \frac{11.25}{\sqrt[2]{14.75 \times 34.75}} = 0.496911568774617$$

Operations in this step: 1 square root, 1 division, 1 multiplication

There are a total of 1 square root, 3 divisions, 13 multiplications, 15 additions and 16 subtractions.

Traditional algorithms typically take 1 square root, 3 divisions, $3n+1$ multiplications, $5(n-1)$ additions, and $4n$ subtractions when calculating correlation on two computation subsets each composed of $n$ data elements.

Fig. 5A Cont'd 2

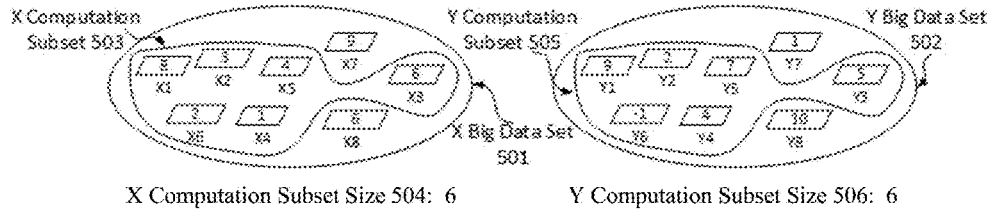

X Computation Subset Size 504: 6   Y Computation Subset Size 506: 6

Calculate Correlation for X Computation Subset 503 and Y Computation Subset 505

Decremental Algorithm 1:

1. Use equation 403 to calculate $\bar{x}_1$ and equation 404 to calculate $\bar{y}_1$ for the 1st iteration:

$$\bar{x}_1 = \frac{\sum_1^n x_i}{n} = \frac{8+3+6+1+4+2}{6} = \frac{24}{6} = 4$$

$$\bar{y}_1 = \frac{\sum_1^n y_i}{n} = \frac{9+2+5+4+7+(-1)}{6} = \frac{26}{6} = 4.3333333333333333$$

Operations in the two steps: 2 divisions, 10 additions

2. Use equation 415 to calculate $XSS_1$ and equation 418 to calculate $x\sigma_1$ for the 1st iteration:

$$XSS_1 = \sum_1^n x_i^2 = 8^2 + 3^2 + 6^2 + 1^2 + 4^2 + 2^2 = 130$$

$$x\sigma_1 = \sqrt[2]{\frac{XSS_1}{6} - \bar{x}_1^2} = \sqrt[2]{\frac{130}{6} - 4^2} = 2.3804761428476167$$

Operations in the steps: 1 square root, 1 division, 7 multiplications, 5 additions, 1 subtraction 3. Use equation 420 to calculate $YSS_1$ and equation 423 to calculate $y\sigma_1$ for the 1st iteration:

$$YSS_1 = \sum_1^6 y_i^2 = 9^2 + 2^2 + 5^2 + 4^2 + 7^2 + (-1)^2 = 81 + 4 + 25 + 16 + 49 + 1 = 176$$

$$y\sigma_1 = \sqrt[2]{\frac{YSS_1}{6} - \bar{y}_1^2} = \sqrt[2]{\frac{176}{6} - 4.3333333333333333^2} = 3.2489314482696547$$

Operations in the two steps: 1 square root, 1 division, 7 multiplications, 5 additions, 1 subtraction 4. Use equation 425 to calculate $SXY_1$ for the 1st iteration:

$$SXY_1 = \sum_1^6 x_i y_i = 8 \times 9 + 3 \times 2 + 6 \times 5 + 1 \times 4 + 4 \times 7 + 2 \times (-1) = 138$$

Operations in this step: 6 multiplications, 5 additions

5. Calculate the correlation $\rho_1$ for the 1st iteration:

$$\rho_1 = \frac{SXY_1 - 6\bar{x}_1\bar{y}_1}{6x\sigma_1 \cdot y\sigma_1} = \frac{138 - 6 \times 4 \times 4.3333333333333333}{6 \times 2.3804761428476167 \times 3.2489314482696547} = 0.7326950970650465$$

Operations in this step: 1 division, 4 multiplications, 1 subtraction

There are a total of 2 square roots, 5 divisions, 24 multiplications, 25 additions and 3 subtractions.

Fig. 5B

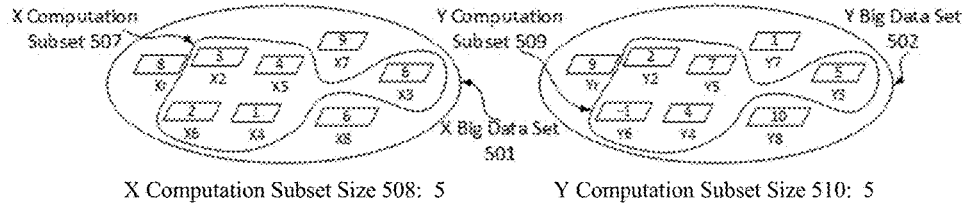

X Computation Subset Size 508: 5    Y Computation Subset Size 510: 5

Calculate Correlation for X Computation Subset 507 and Y Computation Subset 509

Decremental Algorithm 1:

1. Calculate 6-1 and keep its value for future calculation. Operations in this step: 1 subtraction.
2. Use equation 413 to calculate $\bar{x}_2$ and equation 414 to calculate $\bar{y}_2$ for the 2$^{nd}$ iteration:

$$\bar{x}_2 = \frac{6\bar{x}_1 - x_r}{6-1} = \frac{6 \times 4 - 8}{5} = \frac{16}{5} = 3.2, \qquad \bar{y}_2 = \frac{6\bar{y}_1 - y_r}{6-1} = \frac{6 \times 4.3333333333333333 - 9}{5} = \frac{17}{5} = 3.4$$

Operations in the two steps: 2 divisions, 2 multiplications, 2 subtractions

3. Use equation 417 to calculate $XSS_2$ and equation 419 to calculate $x\sigma_2$ for the 2$^{nd}$ iteration:

$$XSS_2 = XSS_1 - x_r^2 = 130 - 8^2 = 130 - 64 = 66$$

$$x\sigma_2 = \sqrt[2]{\frac{XSS_2}{6-1} - \bar{x}_2^2} = \sqrt[2]{\frac{66}{5} - 3.2^2} = 1.7204650534085254$$

Operations in the two steps: 1 square root, 1 division, 2 multiplications, 2 subtractions 4. Use equation 422 to calculate $YSS_2$ and equation 424 to calculate $y\sigma_2$ for the 2$^{nd}$ iteration:

$$YSS_2 = YSS_1 - y_r^2 = 176 - 9^2 = 176 - 81 = 95$$

$$y\sigma_2 = \sqrt[2]{\frac{YSS_2}{6-1} - \bar{y}_2^2} = \sqrt[2]{\frac{95}{5} - 3.4^2} = \sqrt[2]{19 - 11.56} = 2.7276363393971712$$

Operations in the two steps: 1 square root, 1 division, 2 multiplications, 2 subtractions 5. Use equation 427 to calculate $SXY_2$ for the 2$^{nd}$ iteration:

$$SXY_2 = SXY_1 - x_r y_r = 138 - 8 \times 9 = 66$$

Operations in this step: 1 multiplication, 1 subtraction

6. Use equation 428 to calculate $\rho_2$ for the 2$^{nd}$ iteration:

$$\rho_2 = \frac{SXY_2 - (6-1)\bar{x}_2\bar{y}_2}{(6-1)x\sigma_2 \cdot y\sigma_2} = \frac{66 - 5 \times 3.2 \times 3.4}{5 \times 1.7204650534085254 \times 2.7276363393971712} = 0.4943740446449421$$

Operations in this step: 1 division, 4 multiplications, 1 subtraction

There are a total of 2 square roots, 5 divisions, 11 multiplications and 9 subtractions.

Fig. 5B Cont'd 1

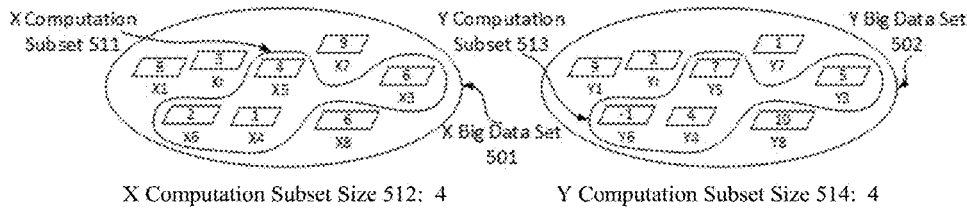

X Computation Subset Size 512: 4    Y Computation Subset Size 514: 4

Calculate Correlation for X Computation Subset 511 and Y Computation Subset 513

Decremental Algorithm 1:

1. Calculate 5-1 and keep its value for future calculation. Operations in this step: 1 subtraction.
2. Use equation 413 to calculate $\bar{x}_3$ and equation 414 to calculate $\bar{y}_3$ for the 3$^{rd}$ iteration:

$$\bar{x}_3 = \frac{(5\bar{x}_2 - x_r)}{5-1} = \frac{(5 \times 3.2 - 3)}{4} = \frac{13}{4} = 3.25 \qquad \bar{y}_3 = \frac{(5\bar{y}_2 - y_r)}{5-1} = \frac{(5 \times 3.4 - 2)}{4} = \frac{15}{4} = 3.75$$

Operations in the two steps: 2 divisions, 2 multiplications, 2 subtractions

3. Use equation 417 to calculate $XSS_3$ and equation 419 to calculate $x\sigma_3$ for the 3$^{rd}$ iteration:

$$XSS_3 = XSS_2 - x_r{}^2 = 66 - 3^2 = 66 - 9 = 57$$

$$x\sigma_3 = \sqrt[2]{\frac{XSS_3}{5-1} - \bar{x}_3{}^2} = \sqrt[2]{\frac{57}{4} - 3.25^2} = 1.9202864369671520$$

Operations in the two steps: 1 square root, 1 division, 2 multiplications, 2 subtractions 4. Use equation 422 to calculate $YSS_3$ and equation 424 to calculate $y\sigma_3$ for the 3$^{rd}$ iteration:

$$YSS_3 = YSS_2 - y_r{}^2 = 95 - 2^2 = 91$$

$$y\sigma_3 = \sqrt[2]{\frac{YSS_3}{5-1} - \bar{y}_3{}^2} = \sqrt[2]{\frac{91}{4} - 3.75^2} = 2.947456530637899$$

Operations in the two steps: 1 square root, 1 division, 2 multiplications, 2 subtractions 5. Use equation 427 to calculate $SXY_3$ for the 3$^{rd}$ iteration:

$$SXY_3 = SXY_2 - x_r y_r = 66 - 3 \times 2 = 60$$

Operations in this step: 1 multiplication, 1 subtraction

6. Use equation 428 to calculate correlation $\rho_3$ for the 3$^{rd}$ iteration:

$$\rho_3 = \frac{SXY_3 - (5-1)\bar{x}_3 \bar{y}_3}{(5-1)x\sigma_3 \cdot y\sigma_3} = \frac{60 - 4 \times 3.25 \times 3.75}{4 \times 1.9202864369671520 \times 2.947456530637899} = 0.4969115687746171$$

Operations in this step: 1 division, 4 multiplications, 1 subtraction.

There are a total of 2 square roots, 5 divisions, 11 multiplications and 9 subtractions.

Fig. 5B Cont'd 2

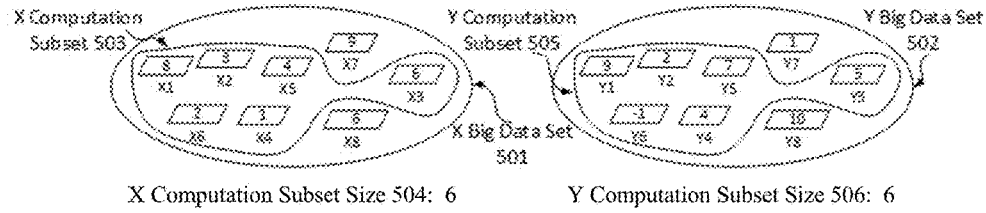

X Computation Subset Size 504: 6    Y Computation Subset Size 506: 6

Calculate Correlation for X Computation Subset 503 and Y Computation Subset 505

Decremental Algorithm 2:

1. Use equation 403 to calculate $\bar{x}_1$ and equation 404 to calculate $\bar{y}_1$ for the 1$^{st}$ iteration:

$$\bar{x}_1 = \frac{\sum_1^n x_i}{n} = \frac{8+3+6+1+4+2}{6} = \frac{24}{6} = 4$$

$$\bar{y}_1 = \frac{\sum_1^n y_i}{n} = \frac{9+2+5+4+7+(-1)}{6} = \frac{26}{6} = 4.3333333333333333$$

Operations in the two steps: 2 divisions, 10 additions

2. Use equation 429 to calculate $SSDX_1$ for the 1$^{st}$ iteration:

$$SSDX_1 = \sum_1^6 (x_i - \bar{x}_1)^2 = (8-4)^2 + (3-4)^2 + (6-4)^2 + (1-4)^2 + (4-4)^2 + (2-4)^2 = 34$$

Operations in this step: 6 multiplications, 5 additions, 6 subtractions

3. Use equation 432 to calculate $SSDY_1$ for the 1$^{st}$ iteration:

$$SSDY_1 = \sum_1^6 (y_i - \bar{y}_1)^2 = (9 - 4.3333333333333333)^2 + (2 - 4.3333333333333333)^2 + (5 - 4.3333333333333333)^2 + (4 - 4.3333333333333333)^2 + (7 - 4.3333333333333333)^2 + (-1 - 4.3333333333333333)^2 = 63.3333333333333334$$

Operations in this step: 6 multiplications, 5 additions, 6 subtractions

4. Use equation 435 to calculate $SDXY_1$ for the 1$^{st}$ iteration:

$$SDXY_1 = \sum_1^6 (x_i - \bar{x}_1)(y_i - \bar{y}_1) = (8-4)(9 - 4.3333333333333333) + (3-4)(2 - 4.3333333333333333) + (6-4)(5 - 4.3333333333333333) + (1-4)(4 - 4.3333333333333333) + (4-4)(7 - 4.3333333333333333) + (2-4)(-1 - 4.3333333333333333) = 34$$

Operations in this step: 6 multiplications, 5 additions, 12 subtractions

5. Use equation 438 to calculate $\rho_1$ for the 1$^{st}$ iteration:

$$\rho_1 = \frac{SDXY_1}{\sqrt[2]{SSDX_1 SSDY_1}} = \frac{34}{\sqrt[2]{34 \times 63.3333333333333312}} = 0.7326950970650465$$

Operations in this step: 1 square root, 1 division, 1 multiplication.

There are a total of 1 square root, 3 divisions, 19 multiplications, 25 additions and 24 subtractions.

Fig. 5C

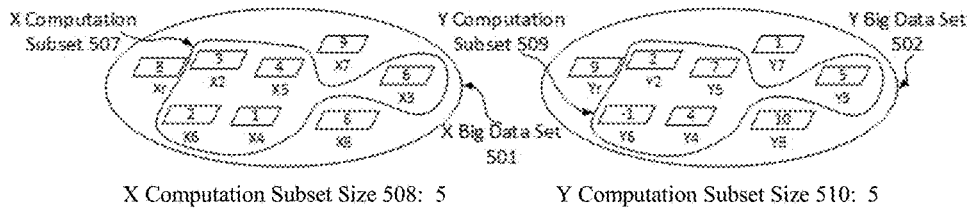

X Computation Subset Size 508: 5   Y Computation Subset Size 510: 5

Calculate Correlation for X Computation Subset 507 and Y Computation Subset 509

Decremental Algorithm 2:

1. Calculate 6-1 and keep its value for future calculation. Operations in this step: 1 subtraction.
2. Use equation 413 to calculate $\bar{x}_2$ and equation 414 to calculate $\bar{y}_2$ for the 2$^{nd}$ iteration:

$$\bar{x}_2 = \frac{6\bar{x}_1 - x_r}{6-1} = \frac{6 \times 4 - 8}{5} = \frac{16}{5} = 3.2$$

$$\bar{y}_2 = \frac{6\bar{y}_1 - y_r}{6-1} = \frac{6 \times 4.3333333333333333 - 9}{5} = \frac{17}{5} = 3.4$$

Operations in the two steps: 2 divisions, 2 multiplications, 2 subtractions

3. Use equation 431 to calculate $SSDX_2$ for the 2$^{nd}$ iteration:

$$SSDX_2 = SSDX_1 - (x_r - \bar{x}_2)(x_r - \bar{x}_1) = 34 - (8 - 3.2)(8 - 4) = 34 - 19.2 = 14.8$$

Operations in this step: 1 multiplication, 3 subtractions

4. Use equation 434 to calculate $SSDY_2$ for the 2$^{nd}$ iteration:

$$\begin{aligned}SSDY_2 &= SSDY_1 - (y_r - \bar{y}_2)(y_r - \bar{y}_1)\\ &= 63.3333333333333334 - (9 - 3.4)(9 - 4.3333333333333333)\\ &= 37.19999999999999988\end{aligned}$$

Operations in this step: 1 multiplication, 3 subtractions

5. Use equation 437 to calculate $SDXY_2$ for the 2$^{nd}$ iteration:

$$SDXY_2 = SDXY_1 - \frac{(6-1)(x_r - \bar{x}_2)(y_r - \bar{y}_2)}{6} = 34 - \frac{5(8-3.2)(9-3.4)}{6} = 34 - 22.4 = 11.6$$

Operations in this step: 1 division, 2 multiplications, 3 subtractions

6. Use equation 438 to calculate $\rho_2$ for the 2$^{nd}$ iteration:

$$\rho_2 = \frac{SDXY_2}{\sqrt[2]{SSDX_2 SSDY_2}} = \frac{11.6}{\sqrt[2]{14.8 \times 37.19999999999999988}} = 0.4943740446449421$$

Operations in this step: 1 square root, 1 division, 1 multiplication.

There are a total of 1 square root, 4 divisions, 7 multiplications and 12 subtractions.

Fig. 5C Cont'd 1

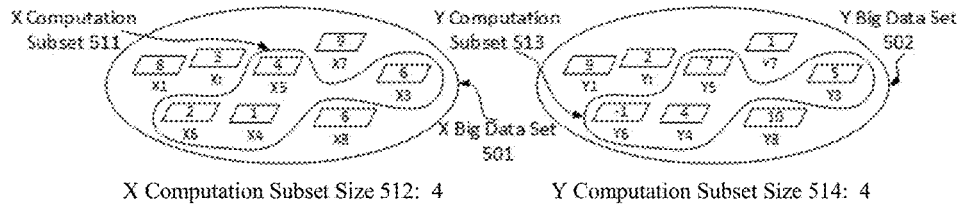

X Computation Subset Size 512: 4    Y Computation Subset Size 514: 4

Calculate Correlation for X Computation Subset 511 and Y Computation Subset 513

Decremental Algorithm 2:

1. Calculate 5-1 and keep its value for future calculation. Operations in this step: 1 subtraction.
2. Use equation 413 to calculate $\bar{x}_3$ and equation 414 to calculate $\bar{y}_3$ for the 3$^{rd}$ iteration:

$$\bar{x}_3 = \frac{(5\bar{x}_2 - x_r)}{5-1} = \frac{(5 \times 3.2 - 3)}{4} = \frac{13}{4} = 3.25$$

$$\bar{y}_3 = \frac{(5\bar{y}_2 - y_r)}{5-1} = \frac{(5 \times 3.4 - 2)}{4} = \frac{15}{4} = 3.75$$

Operations in this step: 2 divisions, 2 multiplications, 2 subtractions

3. Use equation 431 to calculate $SSDX_3$ for the 3$^{rd}$ iteration:

$$SSDX_3 = SSDX_2 - (x_r - \bar{x}_3)(x_r - \bar{x}_2) = 14.8 - (3 - 3.25)(3 - 3.2) = 14.75$$

Operations in this step: 1 multiplication, 3 subtractions

4. Use equation 434 to calculate $SSDY_3$ for the 3$^{rd}$ iteration:

$$SSDY_3 = SSDY_2 - (y_r - \bar{y}_3)(y_r - \bar{y}_2) = 37.19999999999999988 - (2 - 3.75)(2 - 3.4)$$
$$= 34.74999999999999988$$

Operations in this step: 1 multiplication, 3 subtractions

5. Use equation 437 to calculate $SDXY_3$ for the 3$^{rd}$ iteration:

$$SDXY_3 = SDXY_2 - \frac{(5-1)(x_r - \bar{x}_3)(y_r - \bar{y}_3)}{5} = 11.6 - \frac{4(3 - 3.25)(2 - 3.75)}{5} = 11.25$$

Operations in this step: 1 division, 2 multiplications, 3 subtractions

6. Use equation 438 to calculate correlation $\rho_3$ for the 3$^{rd}$ iteration:

$$\rho_3 = \frac{SDXY_3}{\sqrt[2]{SSDX_3 SSDY_3}} = \frac{11.25}{\sqrt[2]{14.75 \times 34.74999999999999988}} = 0.4969115687746171$$

Operations in this step: 1 square root, 1 division, 1 multiplication

There are a total of 1 square root, 4 divisions, 7 multiplications and 12 subtractions.

Fig. 5C Cont'd 2

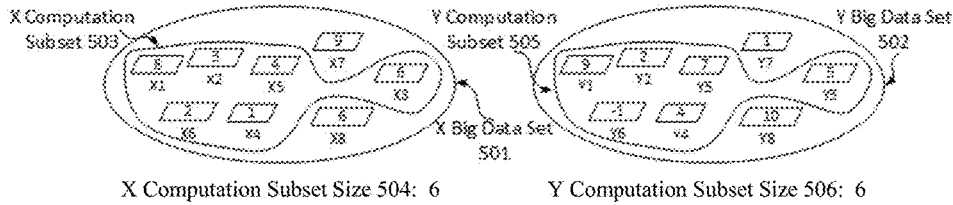

X Computation Subset Size 504: 6       Y Computation Subset Size 506: 6

Calculate Correlation for X Computation Subset 503 and Y Computation Subset 505

Decremental Algorithm 3:

1. Use equation 403 to calculate $\bar{x}_1$ for the 1$^{st}$ iteration:

$$\bar{x}_1 = \frac{\sum_1^6 x_i}{6} = \frac{8+3+6+1+4+2}{6} = \frac{24}{6} = 4$$

Operations in this step: 1 division, 5 additions

2. Use equation 404 to calculate $\bar{y}_1$ for the 1$^{st}$ iteration:

$$\bar{y}_1 = \frac{\sum_1^6 y_i}{6} = \frac{9+2+5+4+7+(-1)}{6} = \frac{26}{6} = 4.3333333333333333$$

Operations in this step: 1 division, 5 additions

3. Use equation 439 to calculate $XSS_1$ for the 1$^{st}$ iteration:

$$XSS_1 = \sum_1^6 x_i^2 = 8^2 + 3^2 + 6^2 + 1^2 + 4^2 + 2^2 = 64 + 9 + 36 + 1 + 16 + 4 = 130$$

Operations in this step: 6 multiplications, 5 additions

4. Use equation 442 to calculate $YSS_1$ for the 1$^{st}$ iteration:

$$YSS_1 = \sum_1^6 y_i^2 = 9^2 + 2^2 + 5^2 + 4^2 + 7^2 + (-1)^2 = 81 + 4 + 25 + 16 + 49 + 1 = 176$$

Operations in this step: 6 multiplications, 5 additions

5. Use equation 445 to calculate $SXY_1$ for the 1$^{st}$ iteration:

$$SXY_1 = \sum_1^6 x_i y_i = 8 \times 9 + 3 \times 2 + 6 \times 5 + 1 \times 4 + 4 \times 7 + 2 \times (-1) = 138$$

Operations in this step: 6 multiplications, 5 additions

6. Use equation 448 to calculate correlation $\rho_1$ for the 1$^{st}$ iteration:

$$\rho_1 = \frac{SXY_1 - 6\bar{x}_1\bar{y}_1}{\sqrt[2]{(XSS_1 - 6\bar{x}_1^2)(YSS_1 - 6\bar{y}_1^2)}} = \frac{138 - 6 \times 4 \times 4.3333333333333333}{\sqrt[2]{(130 - 6 \times 4^2)(176 - 6 \times 4.3333333333333333^2)}} = 0.7326950970650465$$

Operations in this step: 1 square root, 1 division, 6 multiplications, 3 subtractions There are a total of 1 square root, 3 divisions, 24 multiplications, 25 additions and 3 subtractions.

Fig. 5D

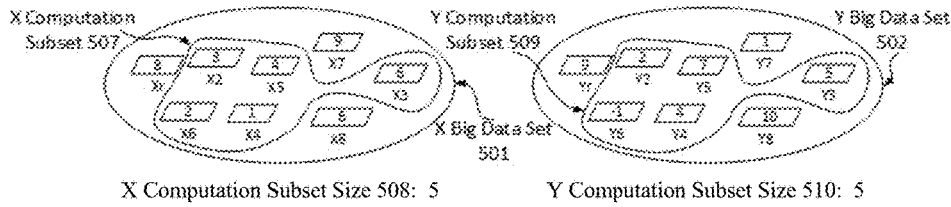

X Computation Subset Size 508: 5    Y Computation Subset Size 510: 5

Calculate Correlation for X Computation Subset 507 and Y Computation Subset 509

Decremental Algorithm 3:

1. Calculate 6-1 and keep its value for future calculation. Operations in this step: 1 subtraction.
2. Use equation 413 to calculate $\bar{x}_2$ for the 2nd iteration:

$$\bar{x}_2 = \frac{6\bar{x}_1 - x_r}{6-1} = \frac{6 \times 4 - 8}{5} = \frac{16}{5} = 3.2$$

Operations in this step: 1 division, 1 multiplication, 1 subtraction

3. Use equation 414 to calculate $\bar{y}_2$ for the 2nd iteration:

$$\bar{y}_2 = \frac{6\bar{y}_1 - y_r}{6-1} = \frac{6 \times 4.3333333333333333 - 9}{5} = \frac{17}{5} = 3.4$$

Operations in this step: 1 division, 1 multiplication, 1 subtraction

4. Use equation 441 to calculate $XSS_2$ for the 2nd iteration:

$$XSS_2 = XSS_1 - x_r^2 = 130 - 8^2 = 66$$

Operations in this step: 1 multiplication, 1 subtraction

5. Use equation 444 to calculate $YSS_2$ for the 2nd iteration:

$$YSS_2 = YSS_1 - y_r^2 = 176 - 9^2 = 95$$

Operations in this step: 1 multiplication, 1 subtraction

6. Use equation 447 to calculate $SXY_2$ for the 2nd iteration:

$$SXY_2 = SXY_1 - x_r y_r = 138 - 8 \times 9 = 66$$

Operations in this step: 1 multiplication, 1 subtraction

7. Use equation 448 to calculate $\rho_2$ for the 2nd iteration:

$$\rho_2 = \frac{SXY_2 - (6-1)\bar{x}_2\bar{y}_2}{\sqrt[2]{(XSS_2 - (6-1)\bar{x}_2^2) \cdot (YSS_2 - (6-1)\bar{y}_2^2)}} = \frac{66 - 5 \times 3.2 \times 3.4}{\sqrt[2]{(66 - 5 \times 3.2^2) \cdot (95 - 5 \times 3.4^2)}} = 0.4943740446449421$$

Operations in this step: 1 square root, 1 division, 7 multiplications, 3 subtractions There are a total of 1 square root, 3 divisions, 12 multiplications and 9 subtractions.

Fig. 5D Cont'd 1

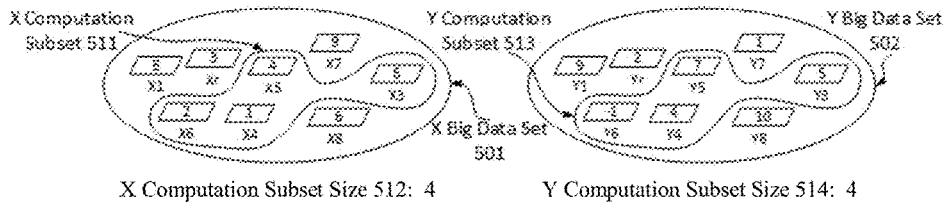

X Computation Subset Size 512: 4    Y Computation Subset Size 514: 4

Calculate Correlation for X Computation Subset 511 and Y Computation Subset 513

Decremental Algorithm 3:

1. Calculate 5-1 and keep its value for future calculation. Operations in this step: 1 subtraction.
2. Use equation 413 to calculate $\bar{x}_3$ for the $3^{rd}$ iteration:

$$\bar{x}_3 = \frac{(5\bar{x}_2 - x_r)}{5-1} = \frac{(5 \times 3.2 - 3)}{4} = \frac{13}{4} = 3.25$$

Operations in this step: 1 division, 1 multiplication, 1 subtraction

3. Use equation 414 to calculate $\bar{y}_3$ for the $3^{rd}$ iteration:

$$\bar{y}_3 = \frac{(5\bar{y}_3 - y_r)}{5-1} = \frac{(5 \times 3.4 - 2)}{4} = \frac{15}{4} = 3.75$$

Operations in this step: 1 division, 1 multiplication, 1 subtraction

4. Use equation 441 to calculate $XSS_3$ for the $3^{rd}$ iteration:

$$XSS_3 = XSS_2 - x_r^2 = 66 - 3^2 = 57$$

Operations in this step: 1 multiplication, 1 subtraction

5. Use equation 444 to calculate $YSS_3$ for the $3^{rd}$ iteration:

$$YSS_3 = YSS_2 - y_r^2 = 95 - 2^2 = 91$$

Operations in this step: 1 multiplication, 1 subtraction

6. Use equation 447 to calculate $SXY_3$ for the $3^{rd}$ iteration:

$$SXY_3 = SXY_2 - x_r y_r = 66 - 3 \times 2 = 60$$

Operations in this step: 1 multiplication, 1 subtraction

7. Use equation 448 to calculate correlation $\rho_3$ for the $3^{rd}$ iteration:

$$\rho_3 = \frac{SXY_3 - (5-1)\bar{x}_3\bar{y}_3}{\sqrt[2]{(XSS_3 - (5-1)\bar{x}_3^2) \cdot (YSS_3 - (5-1)\bar{y}_3^2)}} = \frac{60 - 4 \times 3.25 \times 3.75}{\sqrt[2]{(57 - 4 \times 3.25^2) \cdot (91 - 4 \times 3.75^2)}} = 0.4969115687746171$$

Operations in this step: 1 square root, 1 division, 7 multiplications, 3 subtractions There are a total of 1 square root, 3 divisions, 12 multiplications and 9 subtractions.

Fig. 5D Cont'd 2

|  | Square Root | Division | Multiplication | Addition | Subtraction |
|---|---|---|---|---|---|
| Traditional Algorithm | 1 | 3 | 13 | 15 | 16 |
| Decremental Algorithm 1 | 2 | 5 | 11 | 0 | 9 |
| Decremental Algorithm 2 | 1 | 4 | 7 | 0 | 12 |
| Decremental Algorithm 3 | 1 | 3 | 12 | 0 | 9 |

|  | Square Root | Division | Multiplication | Addition | Subtraction |
|---|---|---|---|---|---|
| Traditional Algorithm | 1 | 3 | 3,000,001 | 4,999,995 | 4,000,000 |
| Decremental Algorithm 1 | 2 | 5 | 11 | 0 | 9 |
| Decremental Algorithm 2 | 1 | 4 | 7 | 0 | 12 |
| Decremental Algorithm 3 | 1 | 3 | 12 | 0 | 9 |

DECREMENTAL CORRELATION CALCULATION FOR BIG DATA OR STREAMED DATA USING COMPONENTS

CROSS-REFERENCE TO RELATED APPLICATIONS

This application claims the benefit of provisional patent application Ser. No. 62/089,251, filed 2014 Dec. 9 by the present inventor.

BACKGROUND AND RELEVANT ART

Internet, mobile communications, navigation, online gaming, sensing technologies and large scale computing infrastructures have produced large amounts of data sets every day. Big Data is data that is beyond the processing capacity of conventional database systems and analyzing capacity of traditional analyzing methods due to its large volume and fast moving and growing speed. More companies now rely on Big Data to make real-time decisions to solve various problems. Current methods involve utilizing a lot of computational resources, which are very costly, yet still may not satisfy the needs of real-time decision making based on the newest information, especially in the financial industry. How to efficiently, promptly and cost-effectively process and analyze Big Data presents a difficult challenge to data analysts and computer scientists.

Streamed data is data that is constantly being received by a receiver while being delivered by a provider. Streamed data may be real-time data gathered from sensors and continuously transferred to computing devices or electronic devices. Often this includes receiving similarly formatted data elements in succession separated by some time interval. Streamed data may also be data continuously read from storage devices, e.g., storage devices on multi-computing devices which store a Big Data set. Stream processing has become a focused research area recently due to the following reasons. One reason is that the input data are coming too fast to store entirely for batch processing, so some analysis have to be performed when the data streams in. The second reason is that immediate responses to any changes of the data are required in some application domains, e.g., mobile related applications, online gaming, navigation, real-time stock analysis and automated trading, etc. The third reason is that some applications or electronic devices require streaming processing due to their nature, e.g., audio, video and digital TV, etc.

Processing streamed data may include performing calculations on multiple data elements. Thus, a computing device receiving a stream of data elements typically includes a buffer so that some number of data elements may be stored. Processing the streamed data elements may include accessing data elements stored in the buffer. When performing statistical calculations on streamed data elements, buffer requirements may be quite large. For example, when calculating correlation a (potentially large) number of data elements may need to be accessed.

For Big data set or streamed data processing, some statistical calculations are recalculated as a Big Data set is changed, e.g., when some outdated data elements are removed. Thus, the (potentially large) number of data elements may be repeatedly accessed. For example, it may be that a correlation is calculated for two computation subsets each with n data elements and an input containing a pair of data elements tells which data element is removed from each of the two computation subsets respectively. As such, every time a pair of data elements (one data element from each data set or data stream) is accessed or received, one of the pair data elements is removed from the corresponding computation subset respectively. The all 2n−2 data elements in the two computation subsets are then accessed to recalculate the correlation.

When performing a correlation calculation on all 2n−2 data elements all the 2n−2 data elements in the two computation subsets will be visited and used. As such, each pair of data elements in the two computation subsets needs to be accessed for recalculating the correlation whenever there is a change in the two computation subsets. Depending on necessity, the computation subset size n could be extremely large, so the data elements in a computation subset could be distributed over a cloud comprising hundreds of thousands of computing devices. Re-performing correlation calculations on Big Data or streamed data elements in traditional way is time consuming and is an inefficient use of resources.

BRIEF SUMMARY

The present disclosure describes methods, systems, and computing system program products for decrementally calculating correlation for Big Data or streamed data by decrementally calculating one or more (p ($p \geq 1$)) components of a correlation and then calculating the correlation using one or more decrementally calculated components. Decrementally calculating a correlation avoids visiting and storing all data elements needed by traditional methods, and thus improves the calculation efficiency, saves computing resources and reduces computing system's power consumption.

The computing system decrementally calculates one or more components of a correlation starting from two non-empty computation subsets where one or more components have already been initialized/calculated.

The computing system accesses or receives one pair of Big Data or streamed data elements to be removed from the two computation subsets. The pair of data elements to be removed from the two computation subsets must exist in the two non-empty computation subsets, i.e., the pair of data elements must have been added to the two computation subsets earlier.

The computing system removes the accessed or received pair of data elements from one or two optional storage media as needed.

The computing system modifies the computation subset size by decreasing its value by 1.

The computing system directly decrementally calculates v ($1 \leq v \leq p$) components of a correlation for the modified computation subsets. Directly decrementally calculating the v components includes directly decrementally calculating each of the v components one by one. Directly decrementally calculating a component of a correlation includes: accessing the component calculated for the prior two computation subsets, and mathematically removing any contribution of the removed pair of data elements from the component.

The computing system indirectly decrementally calculating w=p−v components of a correlation as needed: indirectly decrementally calculating the w components includes indirectly decrementally calculating each of the w components one by one. Indirectly decrementally calculating a component includes calculating the component based on one or more components other than the component itself.

The computing system generates a correlation as needed based on one or more decrementally calculated components of a correlation.

The computing system may keep accessing or receiving a pair of data elements to be removed from the two computation subsets, modifying the computation subsets and the computation subset size counter, decrementally calculating one or more components and generating a correlation as needed using one or more decrementally calculated components, and the computing system may repeat this process for as many times as needed.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates the definition of a correlation and traditional equations for calculating a correlation on two computation subsets.

FIG. 4B illustrates some components of a correlation, which may be used for decrementally calculating a correlation on two computation subsets.

FIG. 4C illustrates the first example decremental correlation calculation algorithm (decremental algorithm 1) and its equations for decrementally calculating a correlation based on decrementally calculated components $XS_{k+1}$ or $\bar{x}_{k+1}$, $YS_{k+1}$ or $\bar{y}_{k+1}$, $x\sigma_{k+1}$, and $SXY_{k+1}$.

FIG. 4D illustrates the second example decremental correlation calculation algorithm (decremental algorithm 2) and its equations for decrementally calculating a correlation in two computation subsets based on decrementally calculated components $XS_{k+1}$ or $\bar{x}_{k+1}$, $YS_{k+1}$ or $\bar{y}_{k+1}$, $SSDX_{k+1}$, $SSDY_{k+1}$ and $SDXY_{k+1}$.

FIG. 4E illustrates the third decremental correlation calculation algorithm (decremental algorithm 3) and its equations for decrementally calculating a correlation in two computation subsets based on decrementally calculated components $XS_{k+1}$ or $\bar{x}_{k+1}$, $YS_{k+1}$ or $\bar{y}_{k+1}$, $XSS_{k+1}$, $YSS_{k+1}$ and $SXY_{k+1}$.

FIG. 5A illustrates an example of calculating correlation using traditional algorithms as shown in FIG. 4A.

FIG. 5B illustrates an example of calculating correlation using decremental algorithm 1 as shown in FIG. 4C.

FIG. 5C illustrates an example of calculating correlation using decremental algorithm 2 as shown in FIG. 4D.

FIG. 5D illustrates an example of calculating correlation using decremental algorithm 3 as shown in FIG. 4E.

FIG. 6 illustrates computational loads for traditional correlation algorithms and decremental correlation algorithms with a computation subset of size 4.

FIG. 7 illustrates computational loads for traditional correlation algorithms and decremental correlation algorithms with a computation subset of size 1,000,000.

DETAILED DESCRIPTION

Figure 1:
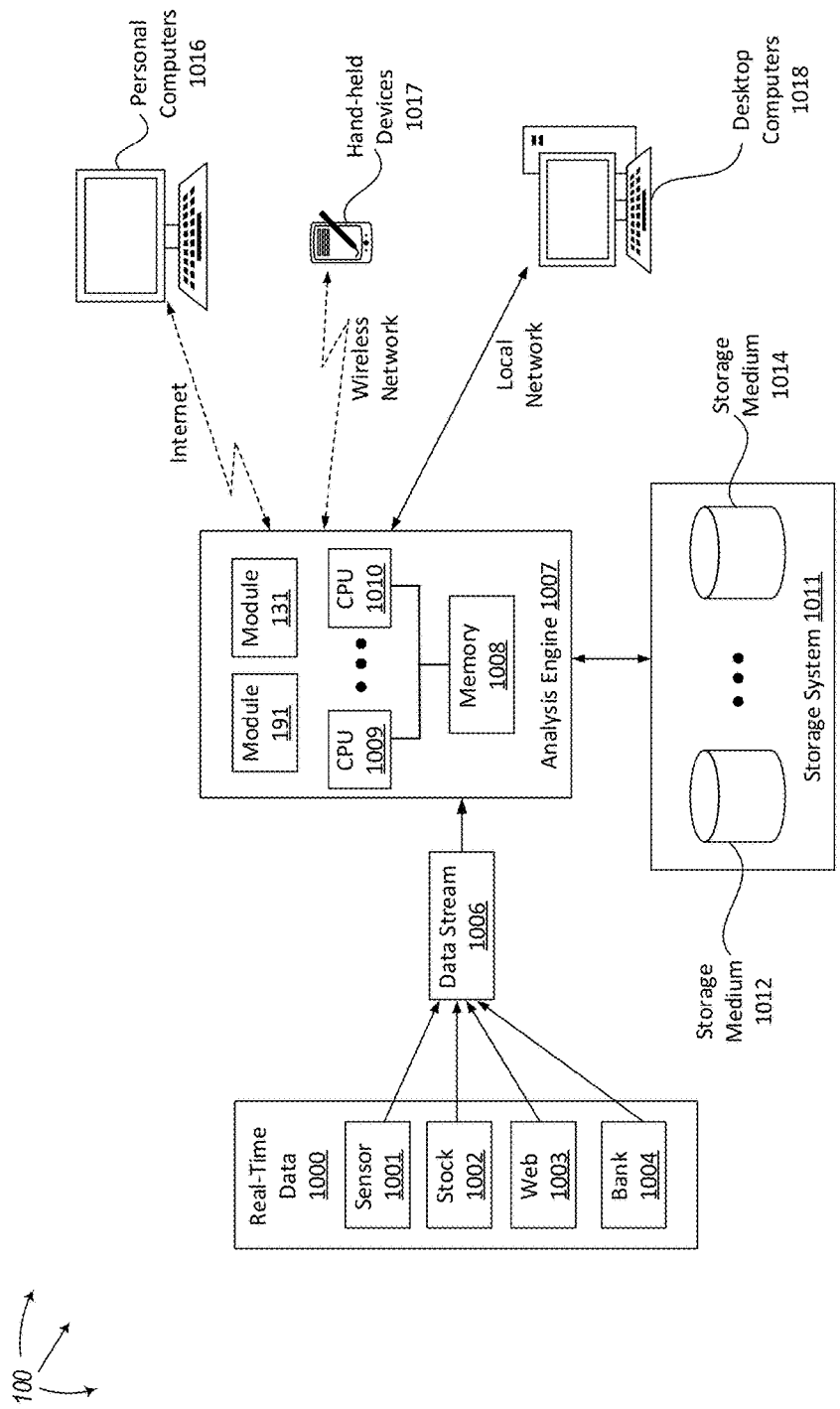
FIG. 1 illustrates a high-level overview of an example computing system that facilitates decrementally calculating correlation for Big Data or streamed data.

The present disclosure describes methods, systems, and computing system program products for decrementally calculating correlation for Big Data or streamed data. Embodiments of the present invention include decrementally calculating one or more (p (p≥1)) components of a correlation for two modified computation subsets based on one or more components of the correlation calculated for two previous computation subsets and then calculating the correlation using one or more decrementally calculated components. Decrementally calculating a correlation avoids visiting and storing all data elements in the two modified computation subsets and performing redundant computations thereby increasing calculation efficiency, saving computing resources and reducing computing system's power consumption. A computing device includes a storage device for storing computation subset size and one or more components of a correlation. The computing device may also optionally include one or two data buffers for keeping data elements contained in two non-empty computation subsets. The computation subset size counter contains a computation subset size which specifies the number of data elements in each of the two computation subsets.

A correlation is a numerical assessment of the strength of relationship between two random variables. The value of a correlation is between −1 and +1. A value of 1 indicates there is a perfect positive linear relationship between the two random variables. A value of −1 indicates there is an exact negative linear relationship between the two random variables. A value near the upper limit, +1, indicates a substantial positive relationship, whereas a value close to the lower limit, −1, indicates a substantial negative relationship. A correlation value close to zero doesn't necessarily mean that there is no any strong relationship between the two variables but just indicates that there is no strong linear relationship between the two random variables.

A computation subset is a subset of a Big Data set which contains the data elements involved in a correlation calculation. A computation subset is equivalent to a moving computation window when performing a correlation calculation on streamed data or time series data. Within the description of embodiments of the present invention, the difference between a computation window and a computation subset is that data elements in a computation window are ordered but that in a computation subset are not.

A correlation calculation works on two random variables, thus it works on two computation subsets. The two computation subsets may be either input and stored separately or input and stored in a combined interleaved manner. For the former case, there will be two Big Data sets or input streams and each Big Data set or input stream contains the data elements of one computation subset respectively, and there will be two buffers and each buffer stores the data elements of one computation subset respectively. For the latter case, there will be a single Big Data set or input stream and the Big Data set or input stream contains multiple data pairs with each data pair containing one data element from each computation subset respectively.

A component of a correlation is a quantity or expression appearing in a correlation's definition equation or any transforms of the definition equation. A correlation is the largest component of the correlation itself. A correlation may be calculated based on one or more of its components. Some example components of a correlation may be found in FIG. 4B.

A component may be either directly decrementally calculated or indirectly decrementally calculated. The difference between them is that when directly decrementally calculating a component, the component is calculated based on the component's value in previous iteration but when indirectly decrementally calculating a component, the component is calculated based on components other than the component itself.

For a given component, it might be directly decrementally calculated in one algorithm but indirectly decrementally calculated in another algorithm.

For a given algorithm, assume the total number of different components is p (p≥1), the number of directly decrementally calculated components is v (1≤v≤p), then the number of indirectly decrementally calculated components is w=p−v (0≤w<p). For any algorithm, there will be at least one component being directly decrementally calculated. It is possible that all components are directly decrementally calculated (in this case v=p and w=0). However, directly decrementally calculated components must be calculated in every iteration no matter if a correlation is accessed or not in a specific iteration.

For a given algorithm, if a component is directly decrementally calculated, then the component must be calculated in every iteration (i.e., whenever a pair of data elements are removed from the two computation subsets). However, if a component is indirectly decrementally calculated, then the component may be calculated as needed, i.e., when a correlation needs to be calculated and accessed. So, when a correlation is not accessed in a specific iteration, only a small number of components are decrementally calculated to save computation time. It should be understood that an indirectly decrementally calculated component may also be used in the calculation of a directly decrementally calculated component. In that case, the indirectly decrementally calculated component should also be calculated in every iteration.

Embodiments of the invention include decrementally calculating one or more components of a correlation in two modified computation subsets based on one or more components calculated for two prior computation subsets.

The computing system decrementally calculates one or more components of a correlation starting from two non-empty computation subsets where the computation subset size counter and one or more components have already been initialized. The initialization of the computation subset size counter comprises counting the number of data elements contained in the computation subset or accessing or receiving a specified computation subset size. The initialization of the one or more components comprises calculating the one or more components through their definitions based on the data elements in the computation subset or accessing or receiving pre-calculated one or more components from one or more computing-device-readable media.

The computing system accesses or receives a pair of data elements to be removed from the two non-empty computation subsets. For streamed data processing, the pair of data elements may be received from one or two streams. For Big Data processing, the pair of data elements may be accessed from one or two storage media.

The computing system removes the accessed or received pair of data elements from one or two optional storage media as needed when performing decremental correlation calculation on streamed data. Pure decremental correlation calculation only needs access to the pair of data elements just accessed or received, so the computing system does not necessarily allocate a storage space to keep all the data elements of two computation subsets. However, since iterative correlation calculation requires access to earlier received data elements, when combining decremental correlation calculation with iterative correlation calculation for streamed data, the accessed or received pair of data elements may need to be removed from one or two storage media allocated for iterative correlation calculation. Thus, the computing system may optionally have one or two storage media for keeping data elements in the two computation subsets.

The computing system modifies the two computation subsets by: removing the pair of streamed data elements from the two computation subsets and updating the computation subset size counter correspondingly by decreasing its value by 1.

The computing system decrementally calculates one or more components of a correlation for the two modified computation subsets based on one or more components calculated for two prior computation subsets and then calculates the correlation based on one or more decrementally calculated components. Decrementally calculating the one or more components includes calculating each of the one or more components for the two modified computation subsets one by one.

The computing system decrementally calculating one or more components of a correlation for the two modified computation subsets includes directly decrementally calculating v (1≤v≤p) components of a correlation for the two modified computation subsets by reusing v components for two prior computation subsets. Directly decrementally calculating v components of a correlation includes accessing each of the v components calculated for two prior computation subsets. Directly decrementally calculating v components of a correlation includes removing any contribution of the removed pair of data elements from each of the v components mathematically. For example, directly decrementally calculating the components includes calculating a sum or mean for each modified computation subset respectively. Calculating the sum or mean includes accessing the sum or mean. Calculating the sum or mean includes removing any contribution of the removed pair of data elements from the sum or mean mathematically.

The computing system decrementally calculating one or more components of a correlation for the two modified computation subsets includes indirectly decrementally calculating w=p−v components of a correlation for the modified computation subsets as needed. Indirectly decrementally calculating the w components of a correlation includes indirectly decrementally calculating each of the w components one by one. Indirectly decrementally calculating a component includes accessing and using one or more components other than the component itself.

The computing system generates a correlation as needed based on one or more decrementally calculated components of a correlation.

The computing system may keep accessing or receiving a pair of data elements to be removed from the two non-empty computation subsets, modifying the computation subsets and the computation subset size counter, decrementally calculating one or more components and generating a correlation as needed using one or more decrementally calculated components, and the computing system may repeat this process for as many times as needed.

Embodiments of the present invention may comprise or utilize a special purpose or general-purpose computing device including computing device hardware, such as, for example, one or more processors and storage devices, as discussed in greater detail below. Embodiments within the scope of the present invention also include physical and other computing-device-readable media for carrying or storing computing-device-executable instructions and/or data structures. Such computing-device-readable media may be any available media that may be accessed by a general purpose or special purpose computing device. Computing-device-readable media that store computing-device-executable instructions are computing device storage media (devices). Computing-device-readable media that carry computing-device-executable instructions are transmission media. Thus, by way of example, and not limitation, embodiments of the invention may comprise at least two distinctly different kinds of computing-device-readable media: computing device storage media (devices) and transmission media.

Computing device storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computing-device-executable instructions or data structures and which may be accessed by a general purpose or special purpose computing device.

A "network" is defined as one or more data links that enable the transport of electronic data between computing devices and/or modules and/or other electronic devices. When information is transferred or provided over a network or another communications connection (either hardwired, wireless, or a combination of hardwired or wireless) to a computing device, the computing device properly views the connection as a transmission medium. Transmissions media may include a network and/or data links which may be used to carry desired program code means in the form of computing-device-executable instructions or data structures and which may be accessed by a general purpose or special purpose computing device. Combinations of the above should also be included within the scope of computing-device-readable media.

Further, upon reaching various computing device components, program code means in the form of computing-device-executable instructions or data structures may be transferred automatically from transmission media to computing device storage media (devices) (or vice versa). For example, computing-device-executable instructions or data structures received over a network or data link may be buffered in RAM within a network interface module (e.g., a "NIC"), and then eventually transferred to computing device RAM and/or to less volatile computing device storage media (devices) at a computing device. Thus, it should be understood that computing device storage media (devices) may be included in computing device components that also (or even primarily) utilize transmission media.

Computing-device-executable instructions comprise, for example, instructions and data which, when executed at a processor, cause a general purpose computing device, special purpose computing device, or special purpose processing device to perform a certain function or group of functions. The computing-device-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments of the present invention may be practiced in network computing environments with many types of computing device configurations, including, personal computers, desktop computers, laptop computers, message processors, hand-held devices, multi-processor systems, microprocessor-based or programmable consumer electronics, network PCs, minicomputers, mainframe computers, supercomputers, mobile telephones, PDAs, tablets, pagers, routers, switches, and the like. Embodiments of the present invention may also be practiced in distributed system environments where local and remote computing devices, which are linked (either by hardwired data links, wireless data links, or by a combination of hardwired and wireless data links) through a network, both perform tasks. In a distributed system environment, program modules may be located in both local and remote memory storage devices.

Embodiments of the invention may also be implemented in cloud computing environments. In this description and the following claims, "cloud computing" is defined as a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud computing model may be composed of various characteristics such as, for example, on-demand self-service, broad network access, resource pooling, rapid elasticity, measured service, and so forth. A cloud computing model may also expose various service models, such as, for example, Software as a Service ("SaaS"), Platform as a Service ("PaaS"), and Infrastructure as a Service ("IaaS"). A cloud computing model may also be deployed using different deployment models such as private cloud, community cloud, public cloud, hybrid cloud, and so forth. In this description and in the claims, a "cloud computing environment" is an environment in which cloud computing is employed.

Several examples will be given in the following sections.

FIG. 1 illustrates a high-level overview of an example computing system 100 that facilitates decrementally calculating correlation for Big Data or streamed data. Referring to FIG. 1, computing system 100 comprises multiple devices connected by different networks, such as local network, internet and wireless network, etc. The multiple devices include, for example, a data analysis engine 1007, a storage system 1011, live data stream 1006, and multiple distributed computing devices that may schedule data analysis tasks and/or query data analysis results, such as personal computer 1016, hand-held devices 1017 and desktop computer 1018, etc. Data analysis engine 1007 may comprise one or more processors, e.g., CPU 1009 and CPU 1010, one or more system memory, e.g., system memory 1008, correlation calculation module 191 and component calculation modules 131. Correlation calculation module 191 and component calculation modules 131 will be illustrated in more details in other figures. Storage system 1011 may comprise one or more storage media, e.g., storage medium 1012 and storage medium 1014, which may be used for hosting Big Data sets. Data sets on storage system 1011 may be accessed by data analysis engine 1007. In general, data stream 1006 may comprise streamed data from different data sources, for example, stock quotes, audio data, video data, geospatial data, web data, mobile communication data, online gaming data, banking transaction data, sensor data, closed-captioning data, etc. To depict a few, real-time data 1000 may comprise data collected from sensor 1001, stock 1002, web 1003 and bank 1004, etc. in real-time. Data analysis engine 1007 may receive data elements from data stream 1006. Data from different data sources may also be stored in storage system 1011 which may be accessed for Big Data analysis. It should be understood that FIG. 100 is provided to introduce a selection of concepts in a much simplified form, for example, distributed devices 1016 and 1017 may need to go through a firewall to connect data analysis engine 1007, and data accessed or received from data stream 1006 and/or storage system 1011 by data analysis engine 1007 may be filtered by data filters, etc.

Figure 1A:
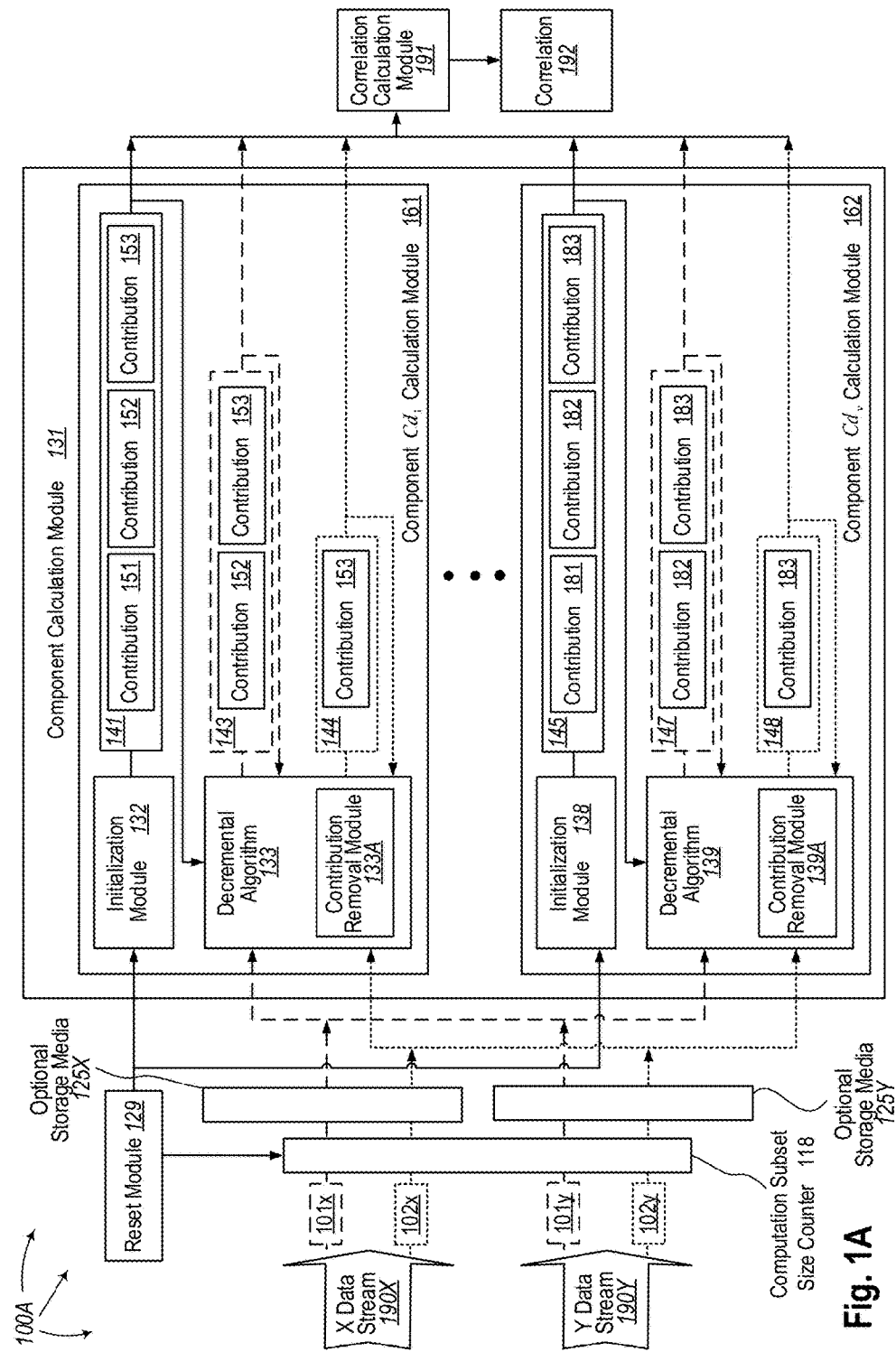
FIG. 1A illustrates an example computing system architecture that facilitates decrementally calculating correlation for streamed data with two inputs with all components being directly decrementally calculated.

FIG. 1A illustrates an example computing system architecture 100A that facilitates decrementally calculating correlation for streamed data with two inputs with all components being directly decrementally calculated. FIG. 1A illustrates 1007 and 1006 shown in FIG. 1. Referring to FIG. 1A, computing system architecture 100A includes decremental component calculation module 131, correlation calculation module 191 and correlation calculation result correlation 192. Decremental component calculation module 131 may be connected to (or is part of) a network, such as, for example, a Local Area Network ("LAN"), a Wide Area Network ("WAN"), and even the Internet. Accordingly, decremental component calculation module 131 as well as any other connected computing devices and their components, may send and receive message related data (e.g., Internet Protocol ("IP") datagrams and other higher layer protocols that utilize IP datagrams, such as, User Datagram Protocol ("UDP"), Real-time Streaming Protocol ("RTSP"), Real-time Transport Protocol ("RTP"), Microsoft® Media Server ("MMS"), Transmission Control Protocol ("TCP"), Hypertext Transfer Protocol ("HTTP"), Simple Mail Transfer Protocol ("SMTP"), etc.) over the network. The output of component calculation module 131 will be used as the input of correlation calculation module 191, and correlation calculation module 191 will generate correlation 192.

In general, X data stream 190X and Y data stream 190Y may be a sequence of digitally encoded signals (e.g., packets of data or data packets) respectively used to transmit or receive information that is in the process of being transmitted. X data stream 190X and Y data stream 190Y may stream data elements or information about data elements, such as for example, indices or addresses of data elements to computing system architecture 100A. X data stream 190X and Y data stream 190Y may be a live stream or may stream stored data respectively. Data stream 190X transmits data elements to be removed from an existing non-empty computation subset X and Data stream 190Y transmits data elements to be removed from an existing non-empty computation subset Y.

Decremental correlation calculation starts from two existing non-empty computation subsets where a computation subset size and one or more components of a correlation for the two computation subsets may have already been initialized or calculated. If not, one or more components of a correlation may be initialized by accessing all data elements in the two computation subsets and calculating the components one by one according to its definition using all data elements in the two computation subsets. For example, in computing system architecture 100A, components ranging from $Cd_1$ 141 to $Cd_v$ 145 may have been initialized. As depicted in FIG. 1A, component $Cd_1$ 141 includes contribution 151 (a contribution from a pair of data elements ($101x$, $101y$)), contribution 152 (a contribution from a pair of data elements ($102x$, $102y$)), and contribution 153 (contributions from other data elements). Similarly, component $Cd_v$ 145 includes contribution 181 (a contribution from a pair of data elements ($101x$, $101y$)) and contribution 182 (a contribution from a pair of data elements ($102x$, $102y$)), and contribution 183 (contributions from other data elements).

Computation subset size counter 118 may be implemented in hardware or software. When it is implemented in hardware, counter 118 may be a small device that may update a computation subset size stored in a location in counter 118. When it is implemented in software, counter 118 may be just a variable stored in RAM, hard drive or any other computing-device-readable storage media, and the content of counter 118 is a computation subset size. Computation subset size counter 118 may be used to keep track the size of a computation subset. Whenever receiving a pair of data elements, the computing system modifies the two computation subsets by removing the pair of data elements from the two computation subsets and adjusts the computation subset size counter 118 by decreasing its content or value by 1. Computation subset size counter 118 may be accessed or received by component calculation module 131, and it may be set to a specific value by reset module 129 when decremental correlation calculation starts working on a non-empty computation subset. Within the description of this disclosure, a computation subset size counter is equivalent to a computation subset size and may be used interchangeably.

For example, as depicted in FIG. 1A, when a pair of data elements ($101x$, $101y$) is received, the counter 118 will be decreased by 1. Both the computation subset size counter 118 and the pair of data elements ($101x$, $101y$) may be accessed or received by component calculation module 131. The data element $101x$ must be an existing data element in X computation subset and data element $101y$ must be an existing data element in Y computation subset.

Subsequently, a pair of data elements ($102x$, $102y$) may be received. When this happens, the computation subset counter 118 will decrease its value by 1. Both the modified computation subset size counter 118 and the pair of data elements ($102x$, $102y$) may be accessed or received by component calculation module 131. Similarly, the data elements $102x$ must be an existing data element in computation subset X and $102y$ must be an existing data element in computation subset Y.

Referring to FIG. 1A, computing system architecture 100A also includes two optional storage media 125X and 125Y. The optional storage media 125X and 125Y are useful when combining decremental correlation calculation with iterative correlation calculation. As streamed data elements are accessed or received, they may be removed from two optional storage media 125X and 125Y as needed (i.e., when combining decremental correlation calculation with iterative correlation calculation).

Referring to computing system architecture 100A, decremental component calculation module 131 comprises v (v=p≥1) component calculation modules for calculating v components for data elements in two computation subsets where v varies depending on the decremental algorithm chosen. As depicted in FIG. 1A, component calculation module 131 comprises component $Cd_1$ calculation module 161 and component $Cd_v$ calculation module 162, and there are v−2 other component calculation modules between them. Calculation module 161 comprises initialization module 132 for initializing component $Cd_1$ and decremental algorithm 133 for directly decrementally calculating component $Cd_1$. Calculation module 162 comprises initialization module 138 for initializing component $Cd_v$ and decremental algorithm 139 for directly decrementally calculating component $Cd_v$. Initialization module 132 is configured to initialize component $Cd_1$ for data elements in two computation subsets. Initialization module 138 is configured to initialize component $Cd_v$ for data elements in two computation subsets. Component $Cd_1$ 141 is the initial value of component $Cd_1$. Initialization module 132 may be used for an initialization of component $Cd_1$ or when correlation calculations are reset. Initialization module 132 initializes component $Cd_1$ 141 to be a specific value composed of contribution 151, contribution 152 and contribution 153 passed in by reset module 129 for two non-empty computation subsets. Similarly, initialization module 138 may be used for an initialization of component $Cd_v$ or when correlation calculations are reset. Component $Cd_v$ 145 is the initial value of component $Cd_v$. Initialization module 138 initializes component $Cd_v$ 145 to be a specific value composed of contribution 181, contribution 182 and contribution 183 passed in by reset module 129 for two non-empty computation subsets.

Decremental algorithms are also configured to calculate v components for data elements in two computation subsets. Decremental algorithm 133 receives a prior component $Cd_1$ value and a pair of data elements removed from two computation subsets as input. Decremental algorithm 133 calculates a component $Cd_1$ for the two modified computation subsets based on the prior component $Cd_1$ value and the removed pair of data elements. Contribution removal module 133A may remove any contribution for the removed pair of data elements from the prior component $Cd_1$. Removing any contribution for the removed pair of data elements may be used to calculate component $Cd_1$ for the two modified computation subsets. Decremental algorithm 139 works in a similar way as decremental algorithm 133. Decremental algorithm 139 receives a prior component $Cd_v$ value and a pair of data elements removed from two computation subsets as input. Decremental algorithm 139 calculates a component $Cd_v$ for the two modified computation subsets based on the prior component $Cd_v$ value and the removed pair of data elements. Contribution removal module 139A may remove any contribution for the removed pair of data elements from the prior component $Cd_v$. Removing any contribution for the removed pair of data elements may be used to calculate component $Cd_v$ for the two modified computation subsets.

Referring to FIG. 1A, computing system architecture 100A also includes correlation calculation module 191 and correlation 192. Once p (p=v≥1) components of a correlation are decrementally calculated by component calculation module 131, correlation calculation module 191 may calculate the correlation 192 as needed using one or more decrementally calculated or initialized components.

Figure 1B:
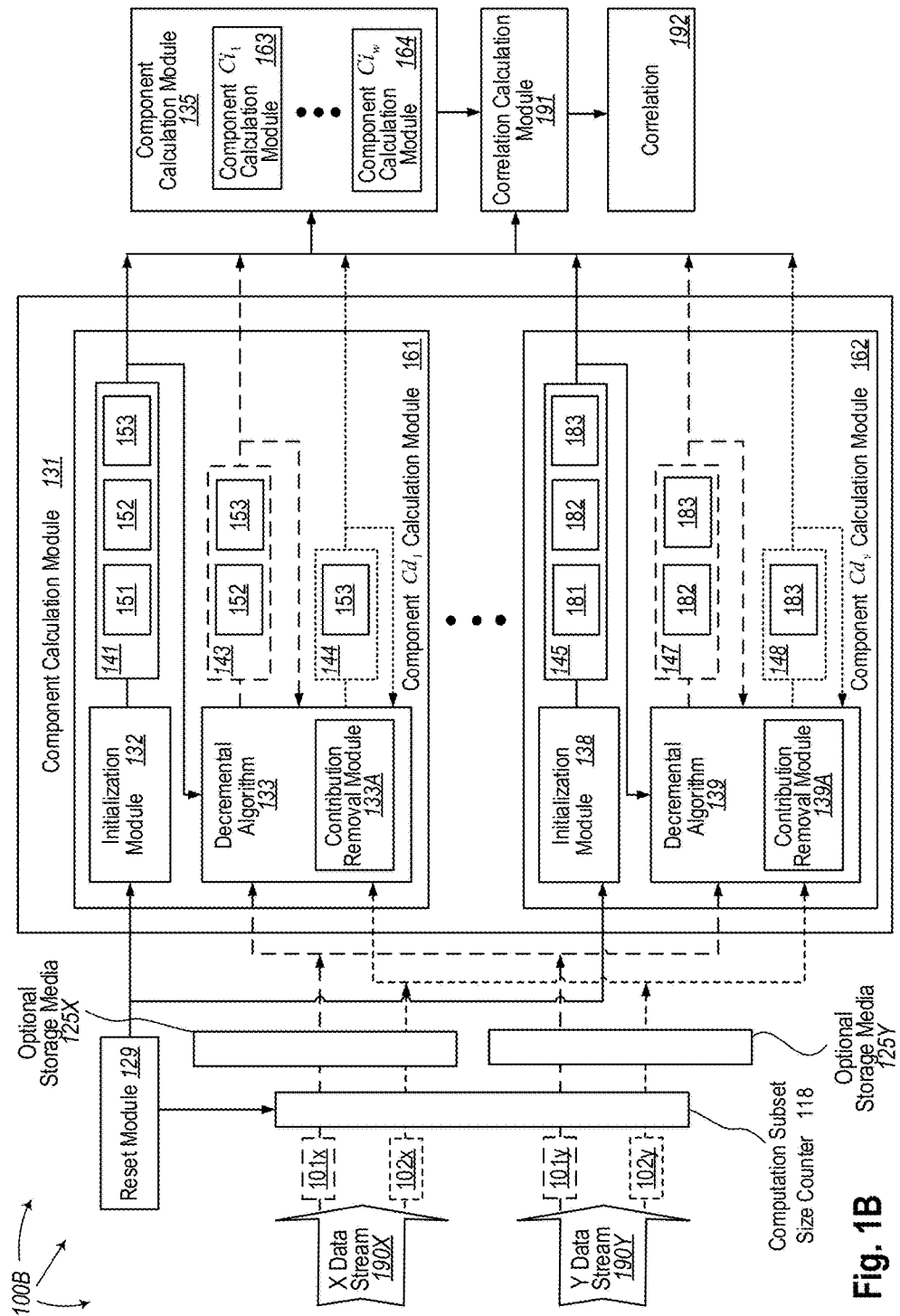
FIG. 1B illustrates an example computing system architecture that facilitates decrementally calculating correlation for streamed data with two inputs with some components being directly decrementally calculated and some components being indirectly decrementally calculated.

FIG. 1B illustrates an example computing system architecture 100B that facilitates decrementally calculating correlation for streamed data with two inputs with some (v (1≤v<p)) components being directly decrementally calculated and some (w=p−v) components being indirectly decrementally calculated. Number v and number w are algorithm dependent. Many parts included in computing system architectures 100B and 100A have same reference numbers. Those parts have similar structures and work in similar ways. In certain implementations, the difference between computing system architectures 100B and 100A may be that architecture 100B includes a component calculation module 135. All parts except component calculation module 135 in 100B work in a similar way as those parts with the same reference numbers in 100A. Instead of repeating what have already been explained in the description about 100A, only the different part is discussed here. Computing system architecture 100B also includes component calculation module 131, which also includes v component calculation modules for directly decrementally calculating v components, however the number v in 100B may not be the same number v as in 100A, because some directly decrementally calculated components in 100A are indirectly decrementally calculated in 100B. In 100A, $v=p \geq 1$, but in 100B, $1 \leq v < p$. Referring to FIG. 1B, computing system architecture 100B includes component calculation module 135. The output of components calculation module 131 may be used as the input of component calculation module 135, and the output of calculation modules 131 and 135 may be used as the input of correlation calculation module 191, and correlation calculation module 191 may generate correlation 192. Component calculation module 135 generally includes $w=p-v$ component calculation modules for indirectly decrementally calculating w components. For example, component calculation module 135 includes calculation module 163 for indirectly decrementally calculating component $Ci_1$ and calculation module 164 for indirectly decrementally calculating component $Ci_w$, and there are $w-2$ component calculation modules in between. Indirectly decrementally calculating w components includes indirectly decrementally calculating each of the w components one by one. Indirectly decrementally calculating a component includes accessing and using one or more components other than the component itself. The one or more components could be initialized, directly decrementally calculated or indirectly decrementally calculated.

Referring to computing system architecture 100B, once all p ($p=v+w$) components have been decrementally calculated, correlation calculation module 191 may be used for calculating a correlation 192 as needed based on one or more decrementally calculated or initialized components.

Figure 1C:
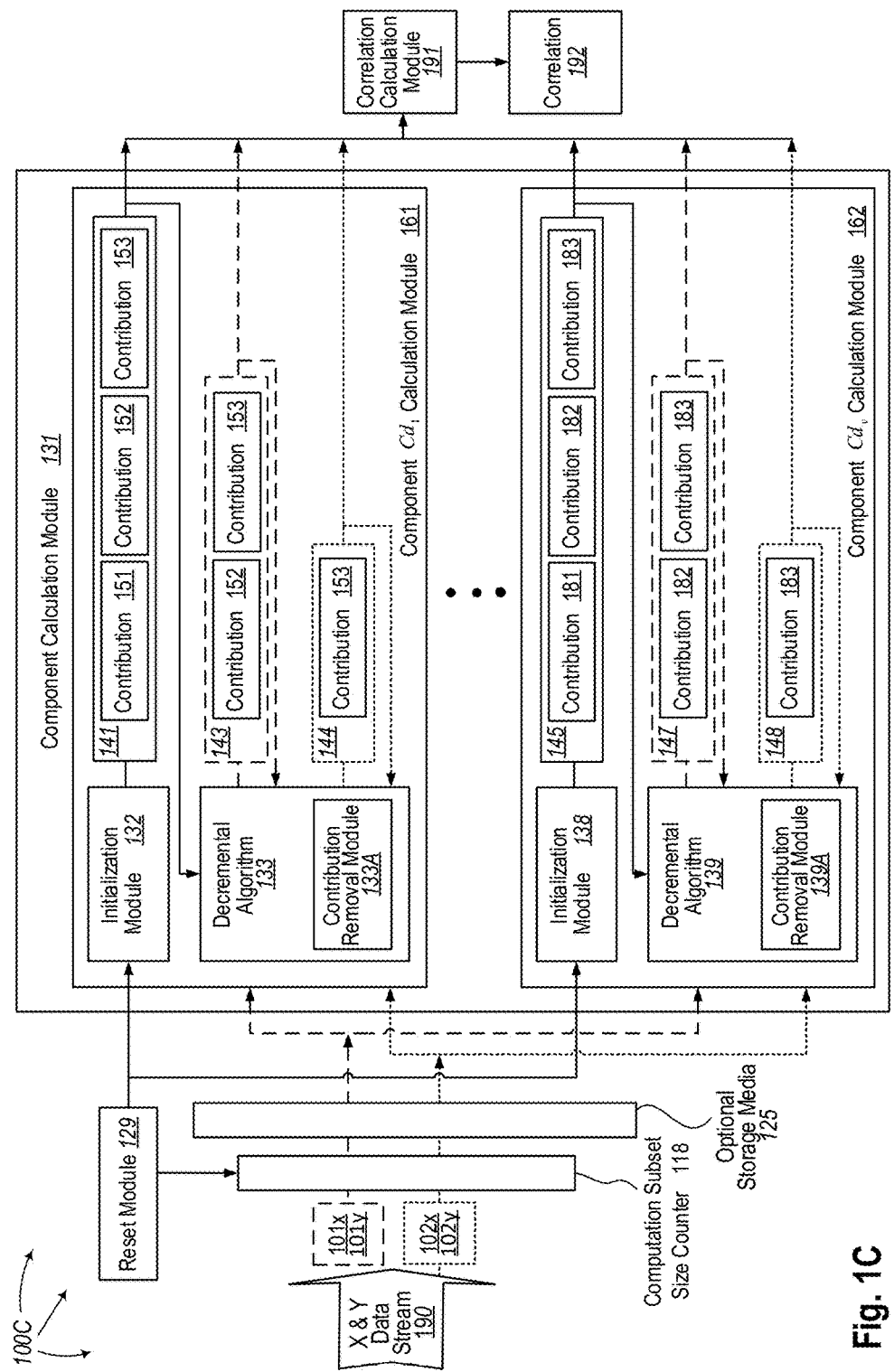
FIG. 1C illustrates another example computing system architecture that facilitates decrementally calculating correlation for streamed data with a single input where data elements from two data streams are interleaved with all components being directly decrementally calculated.

FIG. 1C illustrates an example computing system architecture 100C that facilitates decrementally calculating a correlation for streamed data with a single input where data elements from two data streams are interleaved with all ($p=v \geq 1$) components being directly decrementally calculated. In certain implementations, the difference between computing system architectures 100C and 100A may be that architecture 100C uses a single stream as input where two sets of data elements are interleaved and 100C may store the received data elements in the same way in an optional storage media 125. All parts except the input mode in 100C work in a similar way as those parts with the same reference numbers in 100A. Instead of repeating what have already been explained in the description about 100A, only the different part is discussed here. Referring to FIG. 1C, data stream 190 comprises two interleaved data streams X and Y. As pairs of streamed data elements are accessed or received, the streamed data elements may be placed in a location within an optional storage media 125 (when combining decremental correlation calculation with iterative correlation calculation).

Referring to FIG. 1C, computing system architecture 100C also includes correlation calculation module 191 and correlation 192. Once p ($p=v \geq 1$) components of a correlation are decrementally calculated by component calculation module 131, correlation calculation module 191 may calculate the correlation 192 as needed using one or more decrementally calculated or initialized components.

Figure 1D:
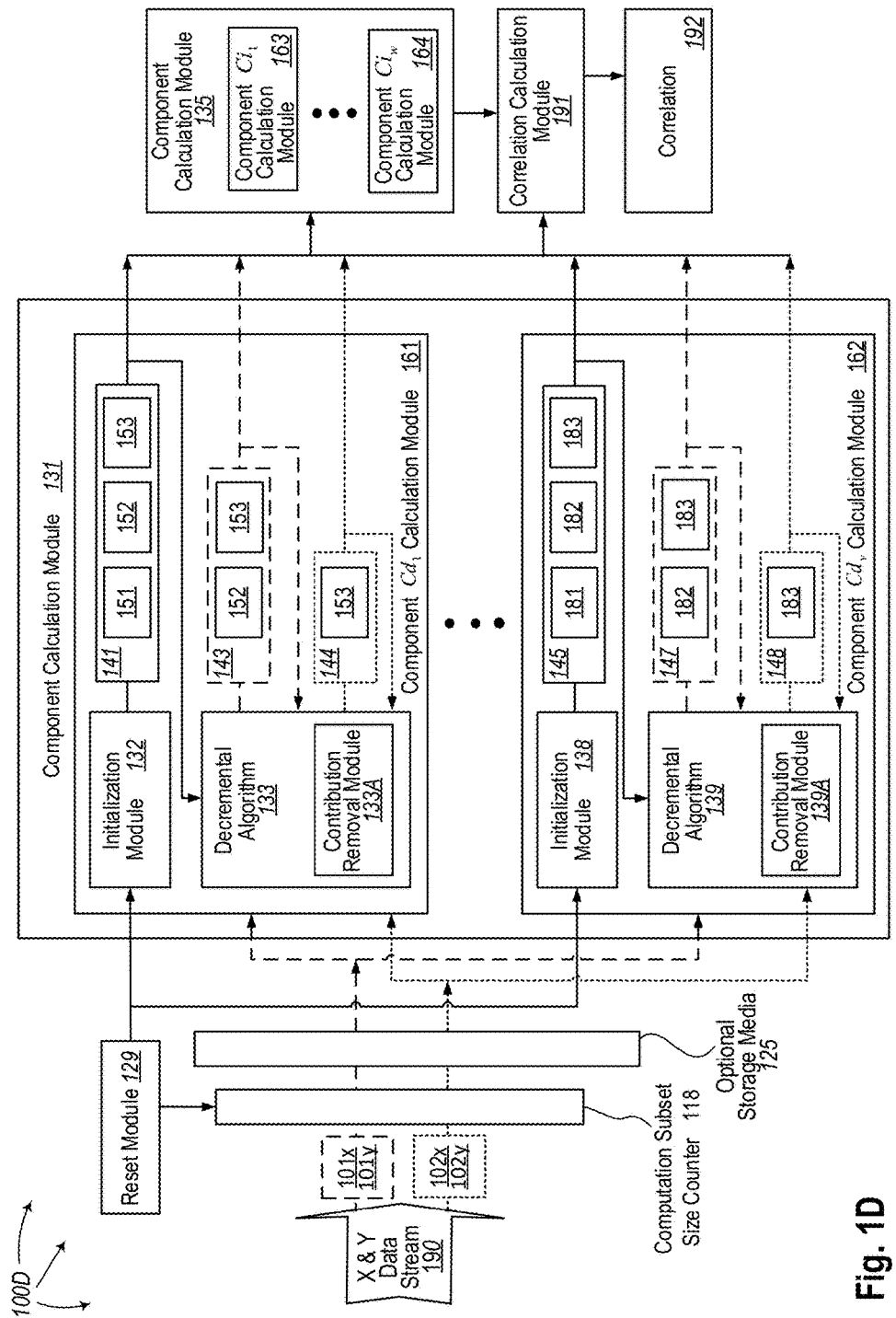
FIG. 1D illustrates another example computing system architecture that facilitates decrementally calculating correlation for streamed data with a single input where data elements from two data streams are interleaved with some components being directly decrementally calculated and some components being indirectly decrementally calculated.

FIG. 1D illustrates an example computing system architecture 100D that facilitates decrementally calculating a correlation for streamed data with a single input where data elements from two data streams are interleaved with some (v ($1 \leq v < p$)) components being directly decrementally calculated and some (w ($w=p-v$)) components being indirectly decrementally calculated. In certain implementations, the difference between computing system architectures 100D and 100C may be that architecture 100D includes a component calculation module 135. All parts except component calculation module 135 in 100D work in a similar way as those parts with the same reference numbers in 100A and 100C. Instead of repeating what have already been explained in the descriptions about 100A and 100C respectively, only the different part is discussed here. Computing system architecture 100D also includes component calculation module 131, which also includes V component calculation modules for directly decrementally calculating v components, however the number v in 100D may not be the same number v as in 100C, because some directly decrementally calculated components in 100C are indirectly decrementally calculated in 100D. In 100C, $v=p \geq 1$, but in 100D, $1 \leq v < p$. Referring to FIG. 1D, computing system architecture 100D includes component calculation module 135. The output of components calculation module 131 may be used as the input of component calculation module 135, and the output of calculation modules 131 and 135 may be used as the input of correlation calculation module 191, and correlation calculation module 191 may generate correlation 192. Component calculation module 135 includes $w=p-v$ component calculation modules for indirectly decrementally calculating w components. Indirectly decrementally calculating w components includes indirectly decrementally calculating each of the w components one by one. Indirectly decrementally calculating a component includes accessing and using one or more components other than the component itself. The one or more components could be initialized, directly decrementally calculated or indirectly decrementally calculated.

Referring to computing system architecture 100D, once all p ($p=v+w$) components have been decrementally calculated, correlation calculation module 191 may be used for calculating a correlation 192 as needed based on one or more decrementally calculated or initialized components.

Figure 1E:
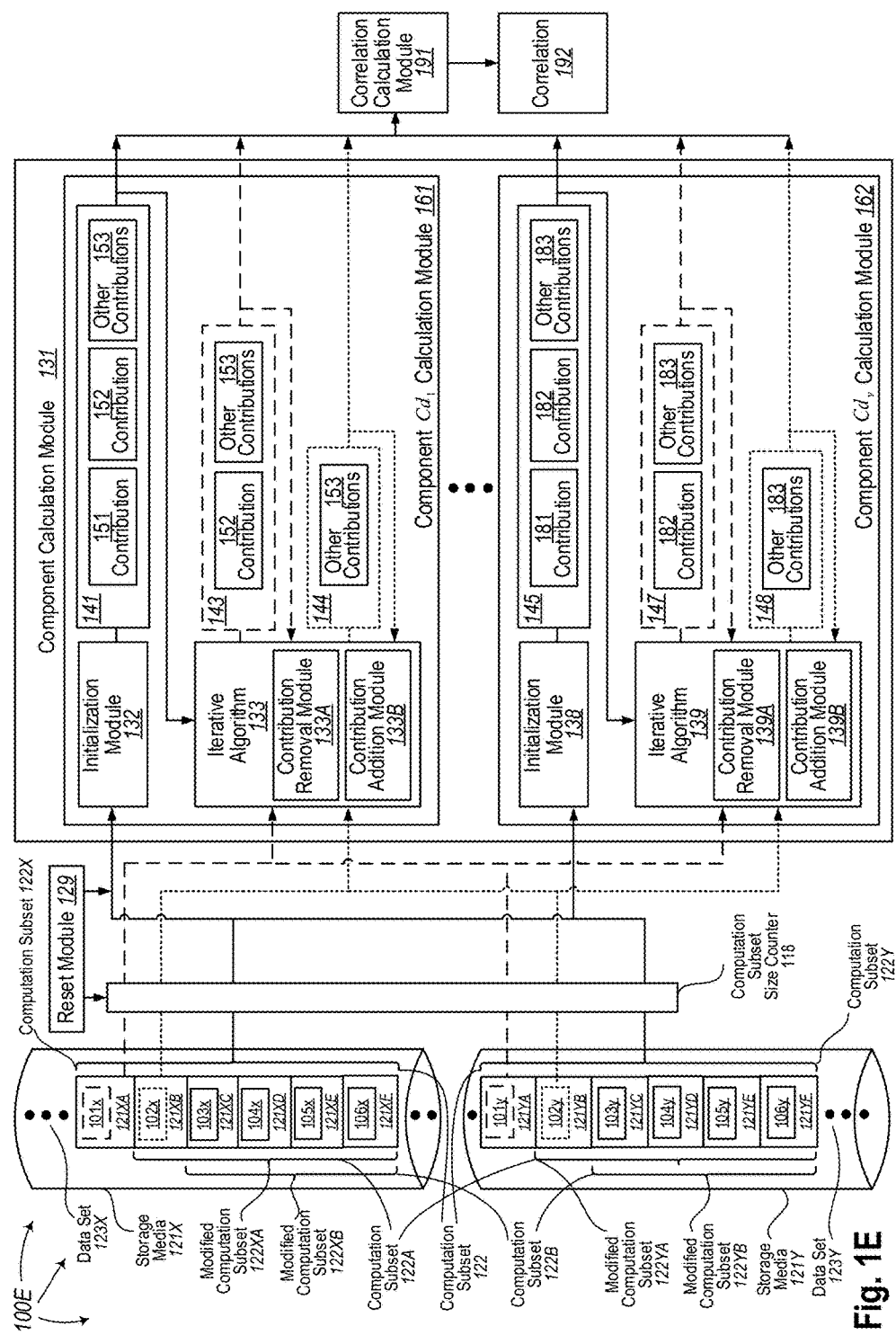
FIG. 1E illustrates an example computing system architecture that facilitates decrementally calculating correlation for Big Data with two inputs with all components being directly decrementally calculated.

FIG. 1E illustrates an example computing system architecture 100E that facilitates decrementally calculating correlation for Big Data with two inputs with all components being directly decrementally calculated. The difference between FIG. 1E and FIG. 1A may be that input data elements are accessed from one or two storage media instead of one or two data streams. Referring to FIG. 1E, computing system architecture 100E includes decremental component calculation module 131, correlation calculation module 191 and correlation calculation result correlation 192. Decremental component calculation module 131 may be tightly coupled with one or more storage media by a high-speed data bus or loosely coupled with one or more storage media managed by a storage system via (or is part of) a network, such as, for example, a Local Area Network ("LAN"), a Wide Area Network ("WAN"), and even the Internet. The output of component calculation module 131 will be used as the input of correlation calculation module 191, and correlation calculation module 191 will generate correlation 192.

Storage media 121X comprises a data set 123X, and storage media 121Y comprises a data set 123Y. As depicted, data set 123X comprises multiple data elements stored in multiple locations of storage media 121X. For example, data elements 101x, 102x, 103x, 104x, 105x and 106x are stored in locations 121XA, 121XB, 121XC, 121XD, 121XE and 121XF of storage media 121X respectively, and there are multiple other data elements stored in other locations of storage media 121X. Similarly, data set 123Y comprises multiple data elements stored in multiple locations of storage media 121Y. For example, data elements 101y, 102y, 103y, 104y, 105y and 106y are stored in locations 121YA, 121YB, 121YC, 121YD, 121YE and 121YF of storage media 121Y respectively, and there are multiple other data elements stored in other locations of storage media 121Y.

Computation subset 122, a non-empty computation subset of data set 123X and 123Y, contains multiple pairs of data elements from the two data sets with each pair containing one data element from each data sets. For example computation subset 122 includes (101x, 101y), (102x, 102y), (103x, 103y), (104x, 104y), (105x, 105y) and (106x, 106y) of data sets 123X and 123Y.

Computation subset size counter 118 is the same as in FIG. 1A, but just that whenever accessing a pair of data elements from the storage media, the computing device adjusts system modifies the two computation subsets by removing the pair of data elements from the two computation subsets and adjusts the computation subset size counter 118 by decreasing its content or value by 1. Computation subset size counter 118 may be accessed or received by component calculation module 131, and it may be set to a specific value by reset module 129 when decremental correlation calculation starts working on a non-empty computation subset. For example, in 100E, before accessing a pair of data elements (101x, 101y), computation subset 122 contains 6 pairs of data elements, so computation subset size counter 118 may be initialized to 6. When a pair of data elements (101x, 101y) is accessed from locations (121XA, 121YA), (101x, 101y) is removed from computation subsets 122X and 122Y respectively, and computation subsets 122X and 122Y become computation subsets 122XA and 122YA respectively, and computation subset size counter 118 is decreased by 1. Both computation subset size counter 118 and data element (101x, 101y) may be accessed or received by component calculation module 131.

Subsequently, a pair of data elements (102x, 102y) may be accessed from locations (121XB, 121YB). (102x, 102y) will be removed from the computation subsets 122XA and 122YA respectively, and computation subsets 122XA and 122YA will become computation subsets 122XB and 122YB respectively. Computation subset size counter 118 will be decreased by 1. Both the modified computation subset size counter 118 and the pair of data elements (102x, 102y) may be accessed or received by component calculation module 131.

Decremental correlation calculation starts from two existing non-empty computation subsets where a computation subset size and one or more components of a correlation for the two computation subsets may have already been initialized or calculated. For example, in computing system architecture 100E, components ranging from $Cd_1$ 141 to $Cd_v$ 145 have been initialized. As depicted in FIG. 1E, component $Cd_1$ 141 includes contribution 151 (a contribution from a pair of data elements (101x, 101y)), contribution 152 (a contribution from a pair of data elements (102x, 102y)), and contribution 153 (contributions from other data elements). Similarly, component $Cd_v$ 145 includes contribution 181 (a contribution from a pair of data elements (101x, 101y)) and contribution 182 (a contribution from a pair of data elements (102x, 102y)), and contribution 183 (contributions from other data elements).

Referring to computing system architecture 100E, decremental component calculation module 131 comprises v (v=p≥1) component calculation modules for calculating v components for data elements in two computation subsets where number v varies depending on the decremental algorithm chosen. As depicted in FIG. 1E, component calculation module 131 comprises component $Cd_1$ calculation module 161 and component $Cd_v$ calculation module 162, and there are v−2 other component calculation modules between them. Calculation module 161 comprises initialization module 132 for initializing component $Cd_1$ and decremental algorithm 133 for directly decrementally calculating component $Cd_1$. Calculation module 162 comprises initialization module 138 for initializing component $Cd_v$ and decremental algorithm 139 for directly decrementally calculating component $Cd_v$. Initialization module 132 is configured to initialize component $Cd_1$ for data elements in two computation subsets. Initialization module 138 is configured to initialize component $Cd_v$ for data elements in two computation subsets. Component $Cd_1$ 141 is the initial value of component $Cd_1$. Initialization module 132 may be used for an initialization of component $Cd_1$ or when correlation calculations are reset. Initialization module 132 initializes component $Cd_1$ 141 to be a specific value composed of contribution 151, contribution 152 and contribution 153 passed in by reset module 129 for two non-empty computation subsets. Similarly, initialization module 138 may be used for an initialization of component $Cd_v$ or when correlation calculations are reset. Component $Cd_v$ 145 is the initial value of component $Cd_v$. Initialization module 138 initializes component $Cd_v$ 145 to be a specific value composed of contribution 181, contribution 182 and contribution 183 passed in by reset module 129 for two non-empty computation subsets.

Decremental algorithms are also configured to calculate v components for data elements in two computation subsets. Decremental algorithm 133 receives a prior component $Cd_1$ value and a pair of data elements removed from two computation subsets as input. Decremental algorithm 133 calculates a component $Cd_1$ for the two modified computation subsets based on the prior component $Cd_1$ value and the removed pair of data elements. Contribution removal module 133A may remove any contribution for the removed pair of data elements from the prior component $Cd_1$. Removing any contribution for the removed pair of data elements may be used to calculate component $Cd_1$ for the two modified computation subsets. Decremental algorithm 139 works in a similar way as decremental algorithm 133. Decremental algorithm 139 receives a prior component $Cd_v$ value and a pair of data elements removed from two computation subsets as input. Decremental algorithm 139 calculates a component $Cd_v$ for the two modified computation subsets based on the prior component $Cd_v$ value and the removed pair of data elements. Contribution removal module 139A may remove any contribution for the removed pair of data elements from the prior component $Cd_v$. Removing any contribution for the removed pair of data elements may be used to calculate component $Cd_v$ for the two modified computation subsets.

Referring to FIG. 1E, computing system architecture 100E also includes correlation calculation module 191 and correlation 192. Once p (p=v≥1) components of a correlation are decrementally calculated by component calculation module 131, correlation calculation module 191 may calculate the correlation 192 as needed using one or more decrementally calculated or initialized components.

Figure 1F:
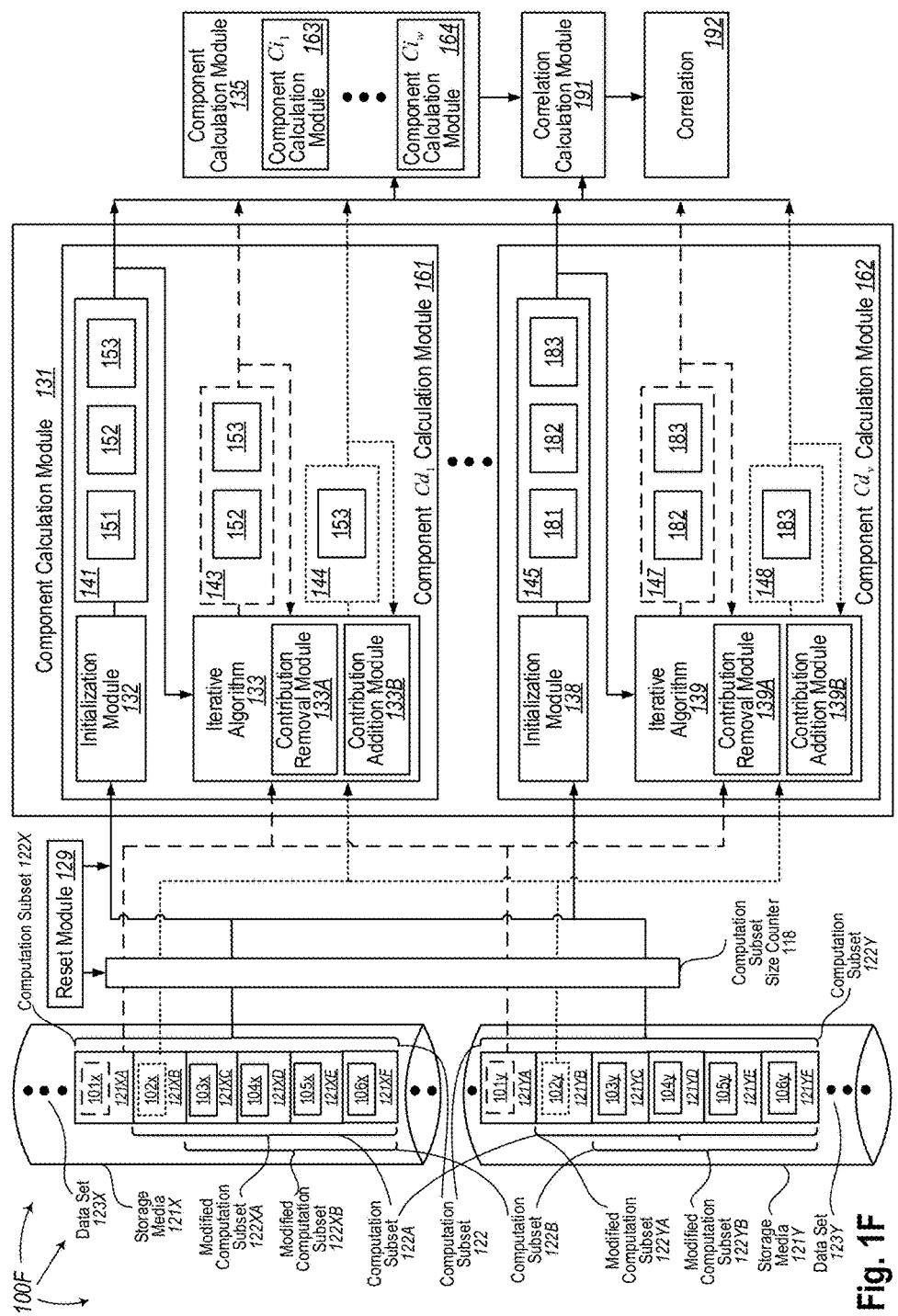
FIG. 1F illustrates an example computing system architecture that facilitates decrementally calculating correlation for Big Data with two inputs with some components being directly decrementally calculated and some components being indirectly decrementally calculated.

FIG. 1F illustrates an example computing system architecture 100F that facilitates decrementally calculating correlation for Big Data with two inputs with some (v ($1 \le v < p$)) components being directly decrementally calculated and some (w=p−v) components being indirectly decrementally calculated. Number v and number w are algorithm dependent. Many parts included in computing system architectures 100F and 100E have same reference numbers. Those parts have similar structures and work in similar ways. In certain implementations, the difference between computing system architectures 100F and 100E may be that architecture 100F includes a component calculation module 135. All parts except component calculation module 135 in 100F work in a similar way as those parts with the same reference numbers in 100E. Instead of repeating what have already been explained in the description about 100E, only the different part is discussed here. The number v in 100F may not be the same number v as in 100E, because some directly decrementally calculated components in 100E are indirectly decrementally calculated in 100F. In 100E, v=p$\ge$1, but in 100F, $1 \le v < p$. Referring to FIG. 1F, computing system architecture 100F includes component calculation module 135. The output of components calculation module 131 may be used as the input of component calculation module 135, and the output of calculation modules 131 and 135 may be used as the input of correlation calculation module 191, and correlation calculation module 191 may generate correlation 192. Component calculation module 135 generally includes w=p−v component calculation modules for indirectly decrementally calculating w components. For example, component calculation module 135 includes calculation module 163 for indirectly decrementally calculating component $Ci_1$ and calculation module 164 for indirectly decrementally calculating component $Ci_w$, and there are w−2 component calculation modules in between. Indirectly decrementally calculating w components includes indirectly decrementally calculating each of the w components one by one. Indirectly decrementally calculating a component includes accessing and using one or more components other than the component itself. The one or more components could be initialized, directly decrementally calculated or indirectly decrementally calculated.

Referring to computing system architecture 100F, once all p (p=v+w) components have been decrementally calculated, correlation calculation module 191 may be used for calculating a correlation 192 as needed based on one or more decrementally calculated or initialized components.

Figure 1G:
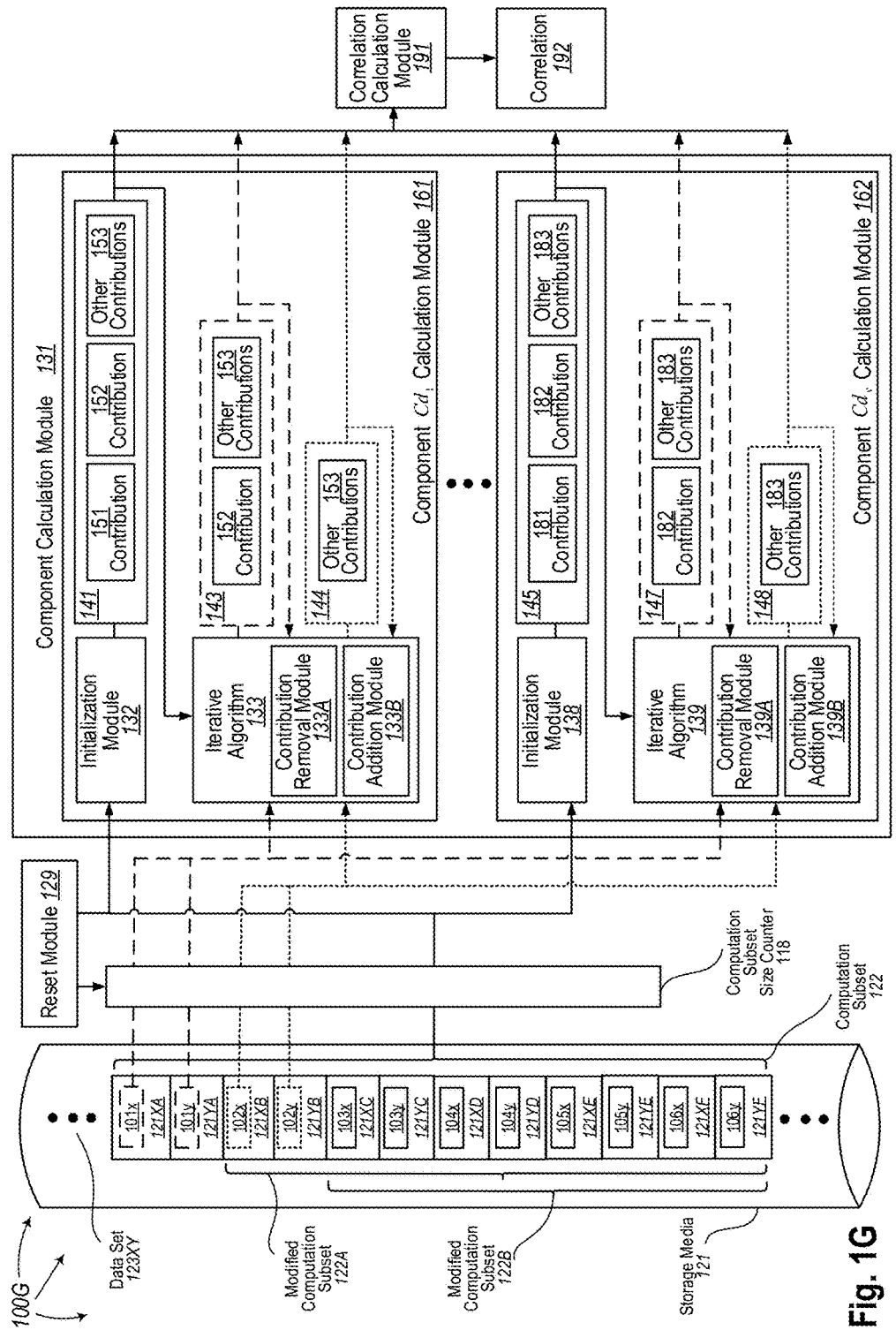
FIG. 1G illustrates another example computing system architecture that facilitates decrementally calculating correlation for Big Data with a single input where data elements from two Big Data sets are interleaved with all components being directly decrementally calculated.
Figure 1G:
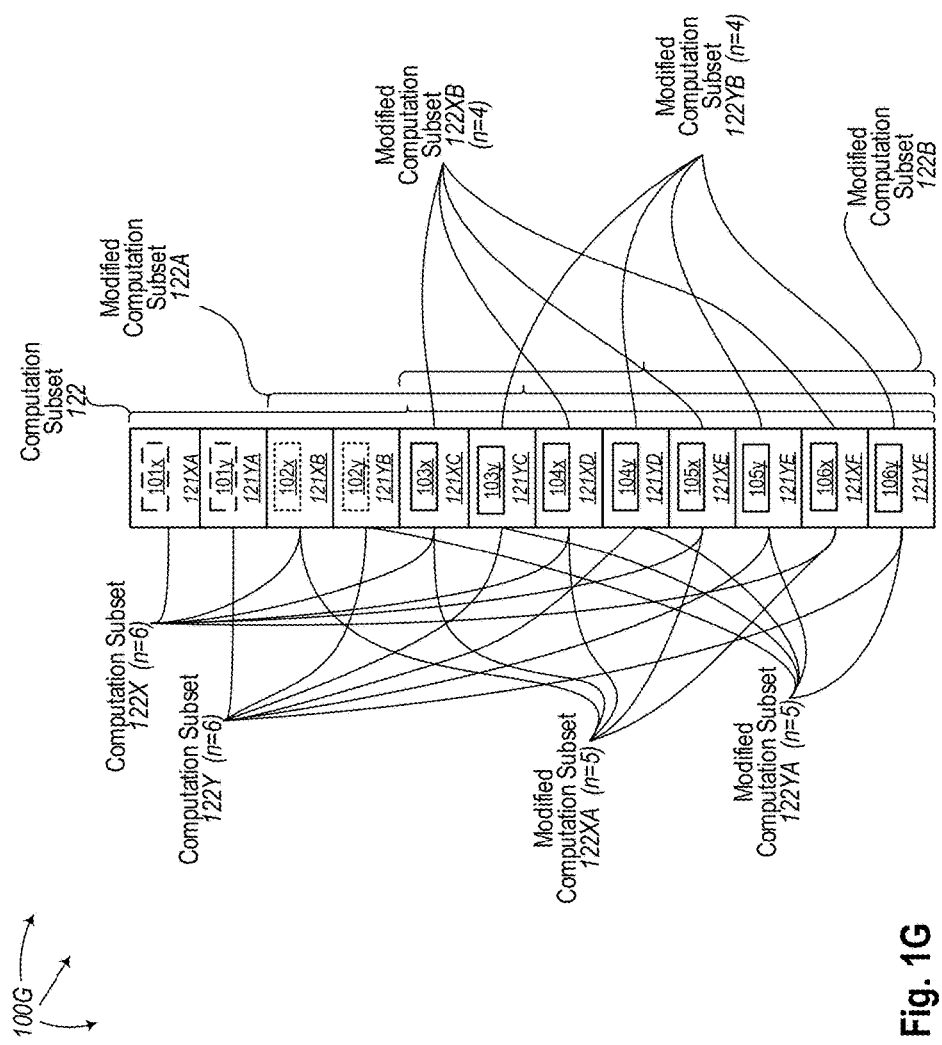

FIG. 1G illustrates an example computing system architecture 100G that facilitates decrementally calculating a correlation for Big Data with a single input where data elements from two Big Data sets are interleaved with all (p=v$\ge$1) components being directly decrementally calculated. In certain implementations, the difference between computing system architectures 100G and 100E may be that architecture 100G uses a single input where two sets of data elements are interleaved. All parts except the input mode in 100G work in a similar way as those parts with the same reference numbers in 100E. Instead of repeating what have already been explained in the description about 100E, only the different part is discussed here. Referring to FIG. 1G, there is a storage media 121. Storage media 121 includes a data set 123XY where data elements from data set X and data set Y are interleaved, i.e., data elements are placed alternatively. As pairs of data elements are accessed, the data elements are accessed from locations that may be next to each other. For example, a pair of data elements ($101x$, $101y$) may be accessed from locations (121XA,121YA) that are next to each other, and a pair of data elements ($102x$, $102y$) may be accessed or received from locations (121XB, 121YB) that are next to each other, and a pair of data elements ($103x$, $103y$) may be accessed or received from locations 121XC and 121YC that are next to each other, and a pair of data elements ($104x$, $104y$) may be accessed or received from locations 121XD and 121YD that are next to each other. Computation subset 122 contains 4 pairs of data elements: ($101x$, $101y$), ($102x$, $102y$), ($103x$, $103y$) and ($104x$, $104y$). The computing system may use data elements in computation subset 122 for initializing one or more components of a correlation.

Next, a pair of data elements ($101x$, $101y$) to be removed from computation subset 122 may be accessed or received. Data elements ($101x$, $101y$) may be accessed or received from locations (121XA,121YA). After ($101x$, $101y$) is removed from computation subsets 122, computation subset 122 becomes modified computation subsets 122A, and computation subset size counter 118 is decreased by 1. The computing system may decrementally calculate a correlation for modified computation subset 122A.

Subsequently, a pair of data elements ($102x$, $102y$) to be removed from modified computation subset 122A may be accessed or received. Data elements ($102x$, $102y$) may be accessed or received from locations (121XB,121YB). After ($102x$, $102y$) is removed from modified computation subset 122A, modified computation subset 122A becomes modified computation subset 122B, and computation subset size counter 118 will be decreased by 1. The computing system may decrementally calculate a correlation for modified computation subset 122B.

As depicted in FIG. 1G, computation subset 122 comprises two computation subsets to be used in correlation calculation: computation subset 122X (n=6) and computation subset 122Y (n=6). Computation subset 122X and computation subset 122Y are stored in an interleaved way (as depicted in FIG. 1G Cont'd). Computation subset 122X contains 6 data elements $101x$, $102x$, $103x$, $104x$, $105x$ and $106x$ and they are stored in 121XA, 121XB, 121XC, 121XD, 121XE and 121XF respectively. Computation subset 122Y contains four data elements $101y$, $102y$, $103y$, $104y$, $105y$ and $106y$ and they are stored in 121YA, 121YB, 121YC, 121YD, 121YE and 121YF respectively. A pair of data elements ($101x$, $101y$) may be accessed or received from location 121XA and 121YA. After the pair of data elements ($101x$, $101y$) is removed from the computation subset, computation subset 122 becomes modified computation subset 122A. When computation subset 122 becomes modified computation subset 122A, computation subsets 122X and 122Y contained in computation subset 122 become modified computation subsets 122XA and 122YA respectively at the same time (as depicted in FIG. 1G Cont'd). A pair of data elements ($102x$, $102y$) may be accessed or received from location 121XB and 121YB. After the pair of data elements ($102x$, $102y$) is removed from the computation subset, modified computation subset 122A becomes modified computation subset 122B. When modified computation subset 122A becomes modified computation subset 122B, modified computation subsets 122XA and 122YA contained in modified computation subset 122A become modified computation subsets 122XB and 122YB respectively at the same time (as depicted in FIG. 1G Cont'd).

FIG. 1G Cont'd illustrates the details about computation subset 122X, modified computation subset 122XA, modified computation subset 122XB, computation subset 122Y, modified computation subset 122YA, and modified computation subset 122YB. Computation subset 122X contains data elements 101x, 102x, 103x, 104x, 105x and 106x that may be accessed or received from locations 121XA, 121XB, 121XC, 121XD, 121XE and 121XF respectively. Computation subset 122Y contains data elements 101y, 102y, 103y, 104y, 105y and 106y that may be accessed or received from locations 121YA, 121YB, 121YC, 121YD, 121YE and 121YF respectively. Modified computation subset 122XA contains data elements 102x, 103x, 104x, 105x and 106x that may be accessed or received from locations 121XB, 121XC, 121XD, 121XE and 121XF respectively. Modified computation subset 122YA contains data elements 102y, 103y, 104y, 105y and 106y that may be accessed or received from locations 121YB, 121YC, 121YD, 121YE and 121YF respectively. Modified computation subset 122XB contains data elements 103x, 104x, 105x and 106x that may be accessed or received from locations 121XC, 121XD, 121XE and 121XF respectively. Modified computation subset 122YB contains data elements 103y, 104y, 105y and 106y that may be accessed or received from locations 121YC, 121YD, 121YE and 121YF respectively.

Referring to FIG. 1G, computing system architecture 100G also includes correlation calculation module 191 and correlation 192. Once p (p=v≥1) components of a correlation are decrementally calculated by component calculation module 131, correlation calculation module 191 may calculate the correlation 192 as needed using one or more decrementally calculated or initialized components.

Figure 1H:
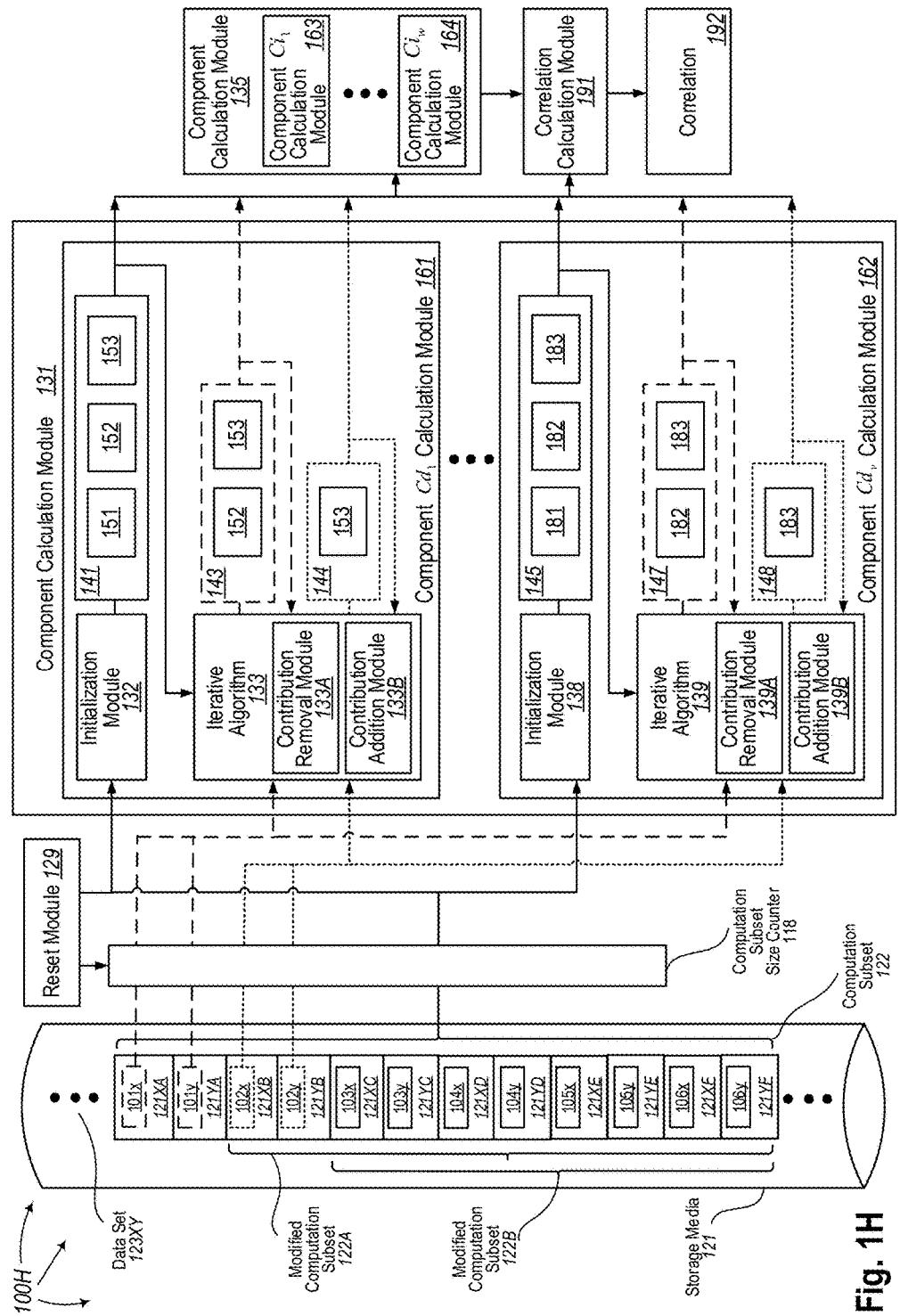
FIG. 1H illustrates another example computing system architecture that facilitates decrementally calculating correlation for Big Data with a single input where data elements from two Big Data sets are interleaved with some components being directly decrementally calculated and some components being indirectly decrementally calculated.
Figure 1H:
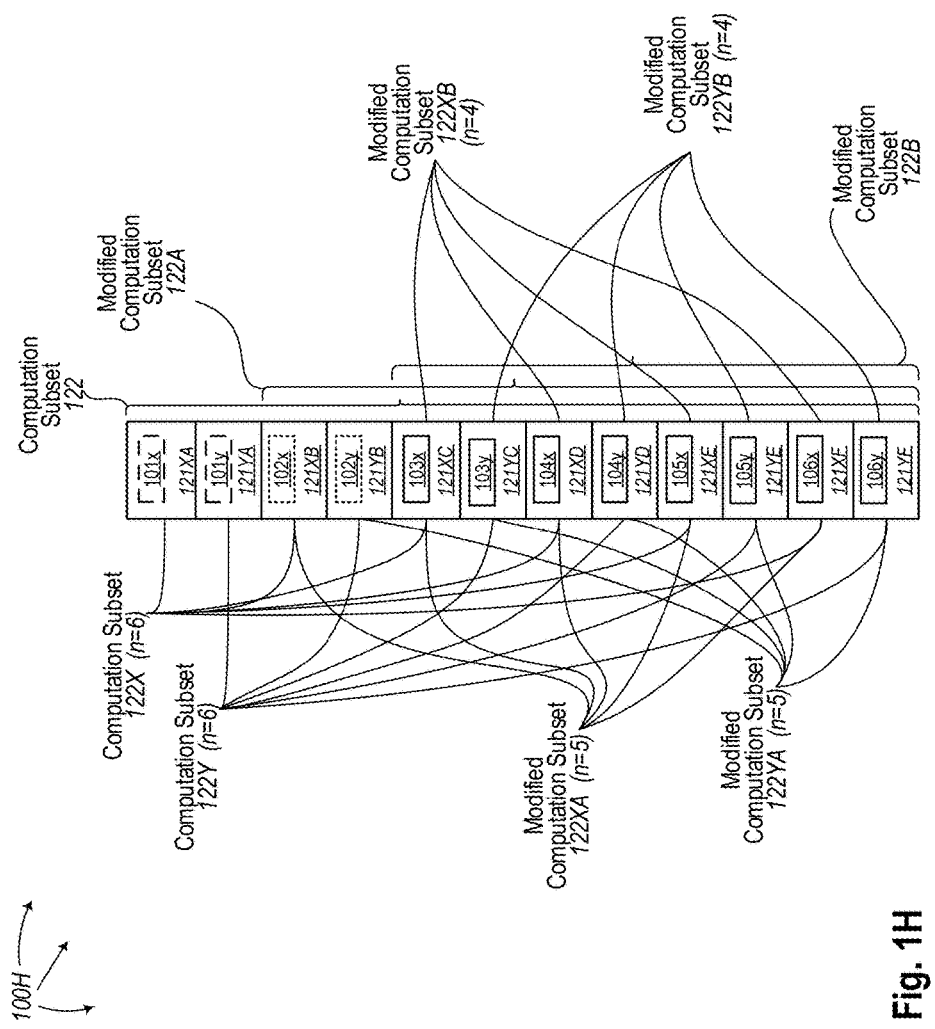

FIG. 1H illustrates an example computing system architecture 100H that facilitates decrementally calculating a correlation for Big Data with a single input where data elements from two Big Data sets are interleaved with some (v (1≤v<p)) components being directly decrementally calculated and some (w (w=p−v)) components being indirectly decrementally calculated. In certain implementations, the difference between computing system architectures 100H and 100G may be that architecture 100H includes a component calculation module 135. All parts except component calculation module 135 in 100H work in a similar way as those parts with the same reference numbers in 100E and 100G. Instead of repeating what have already been explained in the descriptions about 100E and 100G respectively, only the different part is discussed here. Computing system architecture 100H also includes component calculation module 131, which also includes v component calculation modules for directly decrementally calculating v components, however the number v in 100H may not be the same number v as in 100G, because some directly decrementally calculated components in 100G are indirectly decrementally calculated in 100H. In 100G, v=p≥1, but in 100H, 1≤v<p. Referring to FIG. 1H, computing system architecture 100H includes component calculation module 135. Component calculation module 135 includes w=p−v component calculation modules for indirectly decrementally calculating w components. Indirectly decrementally calculating w components includes indirectly decrementally calculating each of the w components one by one. Indirectly decrementally calculating a component includes accessing and using one or more components other than the component itself. The one or more components could be initialized, directly decrementally calculated or indirectly decrementally calculated.

Referring to computing system architecture 100H, once all p (p=v+w) components have been decrementally calculated, correlation calculation module 191 may be used for calculating a correlation 192 as needed based on one or more decrementally calculated or initialized components.

Figure 2:
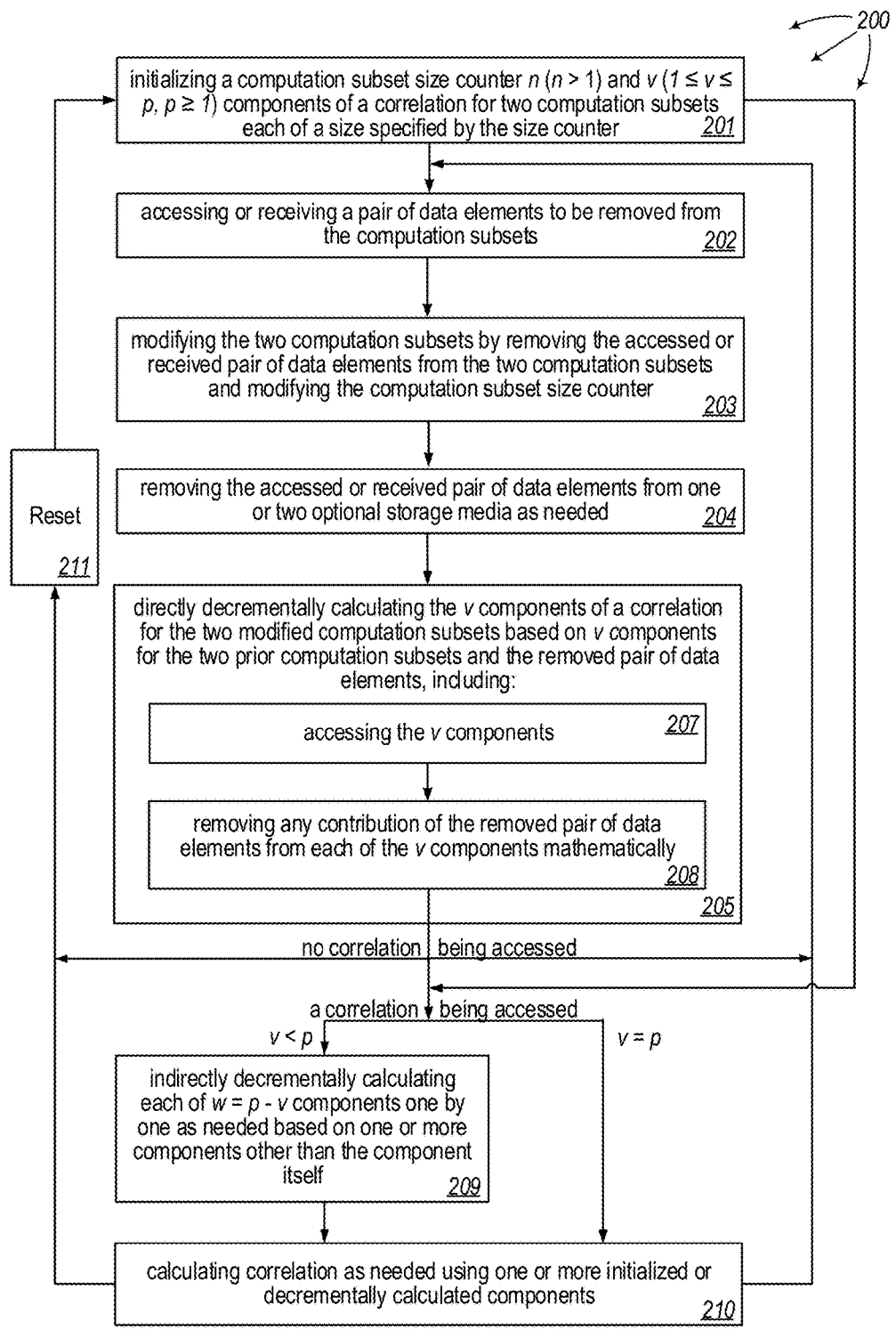
FIG. 2 illustrates a flow chart of an example method for decrementally calculating correlation for Big Data or streamed data.

FIG. 2 illustrates a flow chart of an example method 200 for decrementally calculating correlation for Big Data or streamed data. Method 200 will be described with respect to the components and data of computing system architectures 100A, 100B, 100C and 100D, 100E, 100F, 100G and 100H respectively.

Method 200 includes initializing computation subset size counter 118 and v (1≤v≤p, p≥1) components of a correlation for two computation subsets each of size n (n>1) (201). For example, reset module 129 may set initial values for components ranging from components $Cd_1$ to $Cd_v$ which may be accessed by initialization modules 132 and 138 respectively and corresponding initial value for computation subset size counter 118. Initialization module 132 may access the initial value for component $Cd_1$ and initialize component $Cd_1$ 141 with the value which includes contribution 151 (contribution from the pair of data elements (101x, 101y)), contribution 152 (contribution from the pair of data elements (102x, 102y) and contribution 153 (contribution from other pairs of data elements (103x, 103y), (104x, 104y), . . . ). Similarly, initialization module 138 may access the initial value for component $Cd_v$ and initialize component $Cd_v$ 145 with the value which includes contribution 181 (contribution from the pair of data elements (101x, 101y)), contribution 182 (contribution from the pair of data elements (102x, 102y)) and contribution 183 (contribution from other pairs of data elements (103x, 103y), (104x, 104y), . . . ).

Method 200 includes accessing or receiving a pair of data elements to be removed from the two non-empty computation subsets (202). For example, a pair of data elements (101x, 101y) may be accessed or received. Method 200 includes modifying two computation subsets by removing the pair of data elements from the two computation subsets and modifying the computation subset size counter by decreasing its current value by one (203). For example, 101x is removed from computation subset X and 101y is removed from computation subset Y and computation subset size counter 118 is modified by decreasing its current value by 1 upon accessing or receiving the pair of data elements (101x, 101y) to be removed from the two computation subsets. The two computation subsets before the modification become prior computation subsets.

Method 200 includes removing the accessed or received pair of data elements from one or two optional storage media as needed (204). For example, when combining decremental correlation calculation with iterative correlation calculation, data element 101x may be removed from an optional storage media 125X and data element 101y may be removed from an optional storage media 125Y as needed.

Method 200 includes directly decrementally calculating v (1≤v≤p) components of a correlation for the two modified computation subsets based on the v components for the two prior computation subsets and the pair of data elements removed from the two prior computation subsets (205). For example, decremental algorithm 133 may be used for directly decrementally calculating component $Cd_1$ 143 based on component $Cd_1$ 141 and the pair of data elements (101x, 101y), and decremental algorithm 139 may be used for directly decrementally calculating component $Cd_v$ 147 based on component $Cd_v$ 145 and the pair of data elements (101x, 101y).

Decrementally calculating v components of a correlation for the two modified computation subsets includes accessing the v components of the correlation for the prior computation subsets (207). For example, decremental algorithm 133 may access component $Cd_1$ 141, and decremental algorithm 139 may access component $Cd_v$ 145.

Decrementally calculating v components of a correlation includes removing any contribution of the removed pair of data elements from each of the v components mathematically (208). For example, decrementally calculating component $Cd_1$ 143 may include contribution removal module 133A removing contribution 151 from component $Cd_1$ 141 mathematically, and decrementally calculating component $Cd_v$ 147 may include contribution removal module 139A removing contribution 181 from component $Cd_v$ 145 mathematically. Contribution 151 and 181 are contributions of the pair of data elements (101$x$, 101$y$).

As depicted in FIG. 1A, component $Cd_1$ 143 includes contribution 152 and contribution 153, and component $Cd_1$ 147 includes contribution 182 and contribution 183. Contribution 152 is a contribution from the pair of data elements (102$x$, 102$y$). Contribution 153 is a contribution from the pairs of data elements (103$x$, 103$y$), (104$x$,104$y$), Contribution 182 is a contribution from the pair of data elements (102$x$, 102$y$). Contribution 183 is a contribution from the pairs of data elements (103$x$, 103$y$), (104$x$, 104$y$), . . . .

Besides directly decrementally calculated components, some components may be indirectly decrementally calculated. Method 200 includes indirectly decrementally calculating each of w=p−v components one by one as needed based on one or more components other than the component itself (209) when v<p, i.e., not all components are directly decrementally calculated. Since the w indirectly decrementally calculated components are calculated using other components, they might not need to be initialized. In addition, the w indirectly decrementally calculated components might not need to be calculated in every iteration (i.e., a pair of existing data elements removed from the two computation subsets). They only need to be calculated when a correlation is accessed to save computation time. For example, referring to FIG. 1B where some components are directly decrementally calculated and some are indirectly decrementally calculated, calculation module 163 may indirectly decrementally calculate $Ci_1$ based on one or more components other than $Ci_1$, and the one or more components could be initialized, directly decrementally calculated or indirectly decrementally calculated. Similarly, calculation module 164 may indirectly decrementally calculate $Ci_w$ based on one or more components other than $Ci_w$, and the one or more components could be initialized, directly decrementally calculated or indirectly decrementally calculated. For a directly decrementally calculated component, it must be calculated in every iteration. For example, referring to FIG. 4C, in Decremental Algorithm 1, component $SXY_{k+1}$ for the k+1$^{th}$ iteration is directly decrementally calculated based on component $SXY_k$ for the k$^{th}$ iteration, so it must be calculated in every iteration. However, component $\rho_{k+1}$ is indirectly decrementally calculated based on other components, so $\rho_{k+1}$ only needs to be calculated when it is accessed.

Method 200 includes calculating a correlation using one or more decrementally calculated components of the correlation (210). The one or more components may all be directly decrementally calculated (v=p) (205) or partially be directly decrementally calculated and partially be indirectly decrementally calculated (v<p) (209). For example, correlation calculation module 191 may calculate correlation 192 using initialized components $Cd_1$ 141 and component $Cd_v$ 145. And, correlation calculation module 191 may calculate correlation 192 using decrementally calculated component $Cd_1$ 143 and component $Cd_v$ 147.

202-208 may be repeated as data elements to be removed are accessed or received. 209-210 may be repeated as needed. For example, subsequent to calculating components ranging from $Cd_1$ 143 to $Cd_v$ 147, a next pair of data elements (102$x$, 102$y$) to be removed may be accessed or received.

Decremental algorithm 133 may be used for directly decrementally calculating component $Cd_1$ 144 based on component $Cd_1$ 143. Decremental algorithm 133 may access component $Cd_1$ 143. Directly decrementally calculating component $Cd_1$ 144 may include contribution removal module 133A removing contribution 152 from component $Cd_1$ 143 mathematically. Contribution 152 is a contribution from the next pair of data elements (102$x$, 102$y$). Similarly, decremental algorithm 139 may be used for directly decrementally calculating component $Cd_v$ 148 by reusing component $Cd_v$ 147. Decremental algorithm 139 may access component $Cd_v$ 147. Directly decrementally calculating component $Cd_v$ 148 may include contribution removal module 139A removing contribution 182 from component $Cd_v$ 147 mathematically. Contribution 182 is a contribution from the next pair of data elements (102$x$, 102$y$). As depicted, component $Cd_1$ 144 includes contribution 153 (a contribution from the pairs of data elements (103$x$, 103$y$), (104$x$, 104$y$), . . . ), and component $Cd_v$ 148 includes contribution 183 (a contribution from the pairs of data elements (103$x$, 103$y$), (104$x$, 104$y$), . . . ). When further pair of data elements is accessed or received, component $Cd_1$ 144 may be used for directly decrementally calculating a component $Cd_1$ for the two modified computation subsets and component $Cd_v$ 148 may be used for directly decrementally calculating a component $Cd_v$ for the two modified computation subsets.

As depicted in FIG. 2, reset 211 may be used for resetting decremental correlation calculation. When reset 211 is invoked either after 205 or 210, the computation subset size counter and v components of a correlation will be reset or initialized. For example, component $Cd_1$ 141 may be initialized with a specific value and the value has already been calculated for two non-empty computation subsets. Such case may happen when combining decremental correlation calculation with iterative correlation calculation or incremental correlation calculation. Component $Cd_v$ 145 may be initialized in the same way.

Figure 3A:
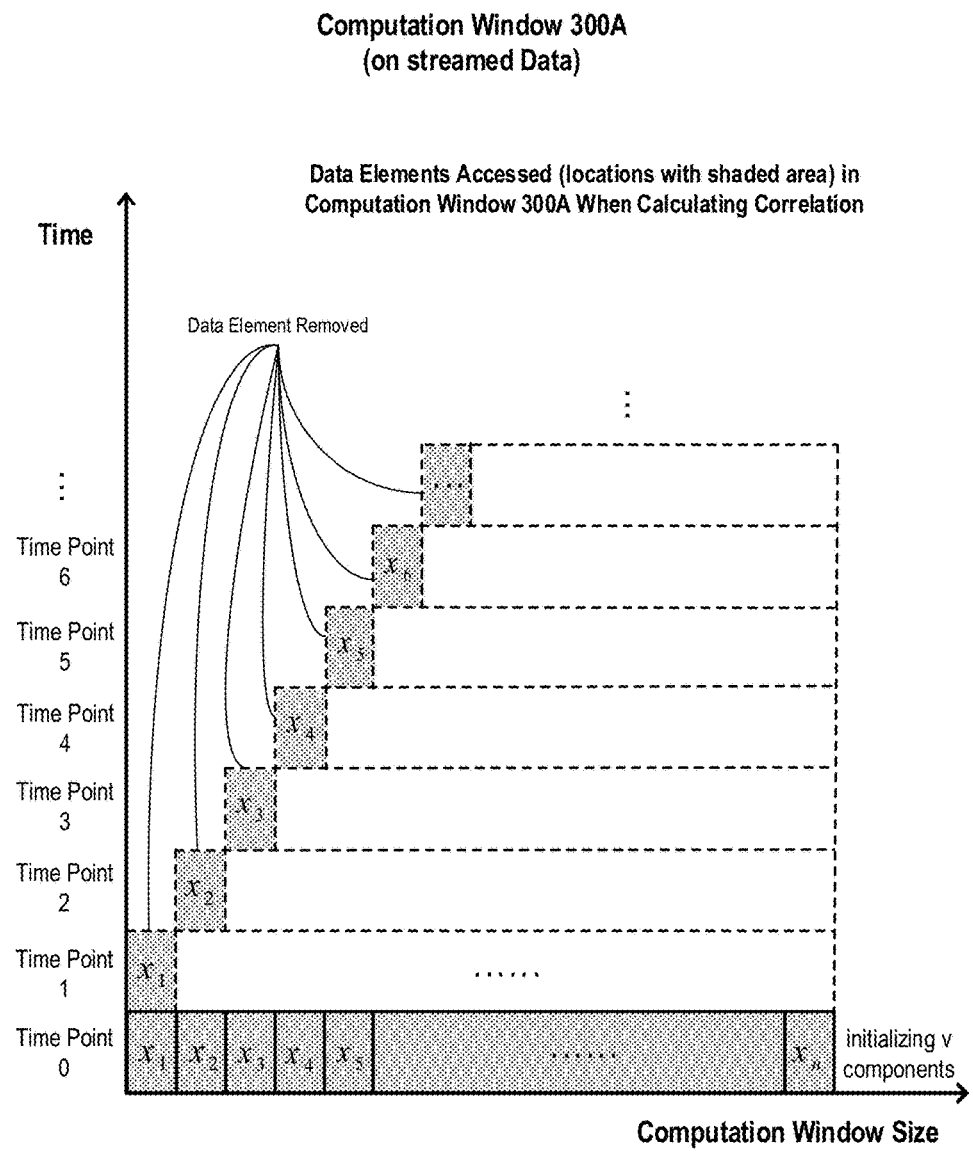
FIG. 3A illustrates data elements that are accessed from one of the two computation windows for decrementally calculating a correlation on streamed data. Data elements in the other computation window are accessed in a similar way.

FIG. 3A illustrates data that is accessed from, one of two computation windows, 300A for decrementally calculating a correlation on streamed data. Data elements in the other computation window are accessed in a similar way, so only one computation window is depicted. Computation window 300A should be non-empty where v components have already been calculated or initialized. The difference between a computation window and a computation subset is that the data elements in a computation window are ordered (e.g., the data element is always removed from either the left end or the right end of a computation window). For example, referring to FIG. 3A, an existing data element is always removed from the left end of computation window 300A. As time progresses, an existing data element, for example, data element $x_1$ then $x_2$, then $x_3$, . . . is removed from the computation window and accessed respectively for directly decrementally calculating v components of a correlation for the modified computation subset, indirectly decrementally calculating w=p−v components, and calculating the correlation using one or more decrementally calculated components. The v components may be directly decrementally calculated using the data element removed from the computation window and the v components for the prior computation window, and other data elements in computation window 300A are not touched. For a given decremental algorithm, v is a constant, so the number of operations for directly decrementally calculating v components is a constant, and the number of operations for indirectly decrementally calculating w=p−v components is also a constant. Thus, the computation workload for calculating all p components for a given computation subset with size n is reduced and a correlation may be calculated using one or more decrementally calculated components. The larger the n, the more substantial the reduction in computation workload.

Figure 3B:
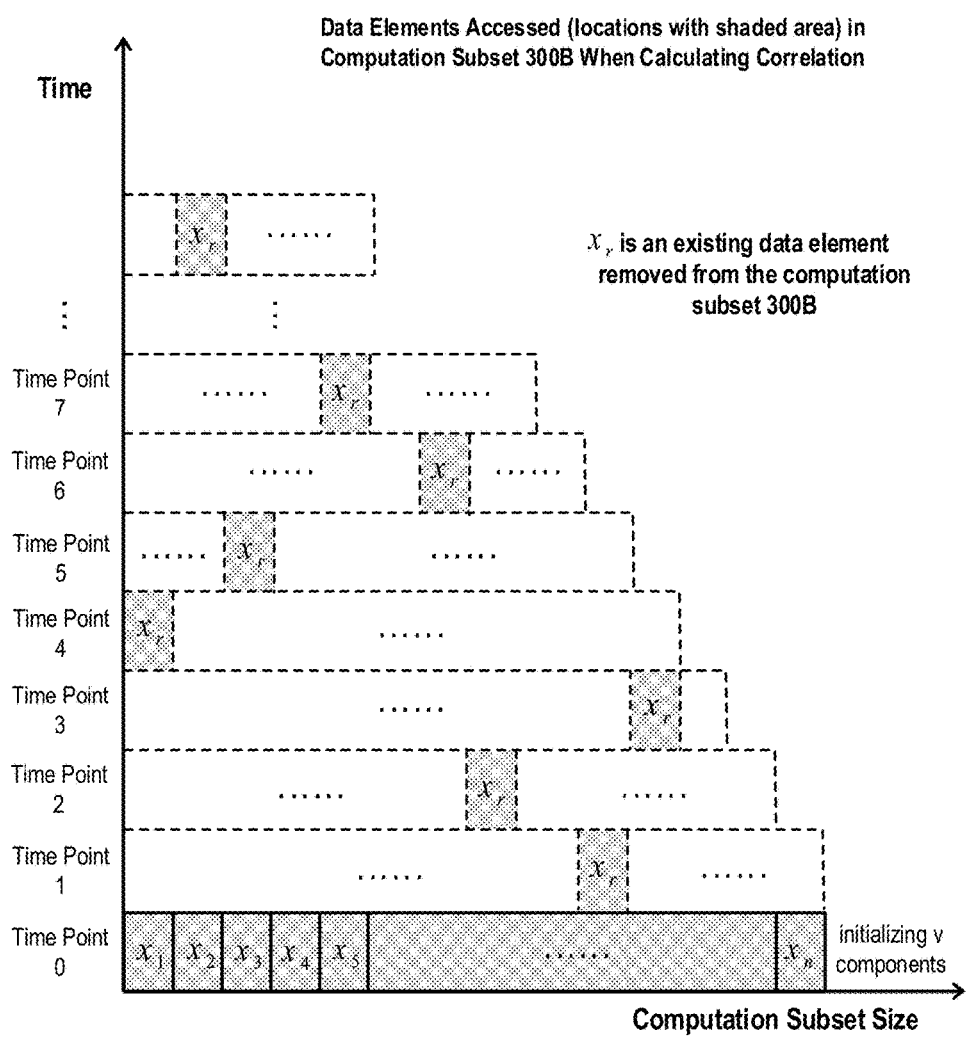
FIG. 3B illustrates data elements that are accessed from one of the two computation subsets for decrementally calculating a correlation on Big Data. Data elements in the other computation subset are accessed in a similar way.

FIG. 3B illustrates data that is accessed from a computation subset 300B for decrementally calculating a correlation on Big Data. Computation subset 300B should be non-empty where v components have already been calculated or initialized. The difference between a computation subset and a computation window is that the data elements in a computation subset are not ordered (e.g., a data element may be removed from any position of a computation subset). For example, referring to FIG. 3B, an existing data element may be removed from any position of computation subset 300B. As time progresses, an existing data element in computation subset 300B, for example, data element $x_r$ at the position indicated by shaded area is removed from the computation subset and accessed for directly decrementally calculating v components of a correlation for the two modified computation subsets, indirectly decrementally calculating w=p−v components, and calculating the correlation using one or more decrementally calculated components. The v components may be directly decrementally calculated using the data element removed from the computation subset and the v components for the previous computation subset, and other data elements in computation subset 300B are not touched. For a given decremental algorithm, v is a constant, so the number of operations for directly decrementally calculating v components is a constant, and the number of operations for indirectly decrementally calculating w=p−v components is also a constant. Thus, the computation workload for calculating all p components for a given computation subset with size n is reduced and a correlation may be calculated using one or more decrementally calculated components. The larger the n, the more substantial the reduction in computation workload.

A few examples of components of a correlation and example decremental correlation algorithms may be found in the following sections.

Suppose there is a computation subset X composed of n data elements: $X=\{x_i|i=1, \ldots, n\}$ and a computation subset Y composed of n data elements: $Y=\{y_i|i=1, \ldots, n\}$. Suppose both X and Y have changed after some time period, say one of the data elements $x_r$ ($1 \le r \le n$) in X is removed and one of the data elements $y_r$ ($1 \le r \le n$) in Y is removed respectively. Whenever a data element is removed, the computation subset is considered as a modified computation subset. A new iteration of calculation is started each time there is a data change in the computation subsets.

FIG. 4A illustrates the definition of correlation. Suppose a computation subset $X=\{x_i|i=1, \ldots, n\}$ is a subset of a Big Data set or streamed data which comprises the data elements to be involved in correlation calculation. Suppose a computation subset $Y=\{y_i|i=1, \ldots, n\}$ is a subset of a Big Data set or streamed data which comprises the data elements to be involved in correlation calculation. Equation 401 is a traditional equation for calculating a sum $XS_k$ of all the data elements in X in the $k^{th}$ iteration. Equation 402 is a traditional equation for calculating a sum $YS_k$ of all the data elements in Y in the $k^{th}$ iteration. Equation 403 is a traditional equation for calculating a mean $\bar{x}_k$ of all the data elements in X in the $k^{th}$ iteration. Equation 404 is a traditional equation for calculating a mean $\bar{y}_k$ of all the data elements in Y in the $k^{th}$ iteration. Equation 405 is a traditional equation for calculating a correlation $\rho_k$ for the two computation subsets X and Y in the $k^{th}$ iteration.

Assuming the computation subset X of size n is changed with a data element $x_r$ being removed. Define the modified computation subset as X'. The modified computation subset size of X' becomes n−1. Assuming the computation subset Y of size n is changed with a data element $y_r$ being removed. Define the modified computation subset as Y'. The modified computation subset size of Y' becomes n−1. The iteration becomes $k+1^{th}$ iteration. Equation 406 is an equation for calculating a sum $XS_{k+1}$ of all the data elements in X' in the $k+1^{th}$ iteration. Equation 407 is an equation for calculating a sum $YS_{k+1}$ of all the data elements in Y' in the $k+1^{th}$ iteration. Equation 408 is an equation for calculating a mean $\bar{x}_{k+1}$ of all the data elements in X' in the $k+1^{th}$ iteration. Equation 409 is an equation for calculating a mean $\bar{y}_{k+1}$ of all the data elements in Y' in the $k+1^{th}$ iteration. Equation 410 is an equation for calculating a correlation $\rho_{k+1}$ of the modified computation subset X' and computation subset Y' in the $k+1^{th}$ iteration.

FIG. 4B illustrates some components of a correlation and basic decremental component calculation equations. A component of a correlation is a quantity or expression appearing in the correlation's definition equation or any transforms of the definition equation. The following are a few example components of a correlation.

$XS_k = \sum_1^n x_i$
$YS_k = \sum_1^n y_i$ $$\bar{x}_k = \frac{XS_k}{n} = \frac{1}{n}\sum_1^n x_i$$

$$\bar{y}_k = \frac{YS_k}{n} = \frac{1}{n}\sum_1^n y_i$$

$XSS_k = \sum_1^n x_i^2$
$YSS_k = \sum_1^n y_i^2$
$SSDX_k = \sum_1^n (x_i - \bar{x}_k)^2$
$SSDY_k = \sum_1^n (y_i - \bar{y}_k)^2$
$SDXY_k = \sum_1^n (x_i - \bar{x}_k)(y_i - \bar{y}_k)$
$SDXY_k = \sum_1^n x_i y_i$ $$RSSDX_k = \sqrt{\sum_1^n (x_i - \bar{x}_k)^2}$$

$$RSSDY_k = \sqrt{\sum_1^n (y_i - \bar{y}_k)^2}$$

$$RSDXY_k = \sqrt{\sum_1^n (x_i - \bar{x}_k)^2 \sum_1^n (y_i - \bar{y}_k)^2}$$

$$x\sigma_k = \sqrt[2]{\frac{\sum_1^n x_i^2}{n} - \bar{x}_k^2}$$

$$y\sigma_k = \sqrt[2]{\frac{\sum_1^n y_i^2}{n} - \bar{y}_k^2}$$

-continued $$\rho_k = \frac{\sum_{1}^{n}(x_i - \bar{x}_k)(y_i - \bar{y}_k)}{\sqrt[2]{\sum_{1}^{n}(x_i - \bar{x}_k)^2 \sum_{1}^{n}(y_i - \bar{y}_k)^2}}$$

$SDXY_k$, $SSDX_k$, $SSDY_k$, $RSSDX_k$, $RSSDY_k$, $RSDXY_k$, $\bar{x}_k$, and $\bar{y}_k$ are components of a correlation because they directly appear in the definition of a correlation. $SXY_k$, $XSS_k$, $YSS_k$, $x\sigma_k$, $y\sigma_k$ are also components of a correlation because they appear in a transform expression of a correlation. Even the correlation $$\rho_k = \frac{\sum_{1}^{n}(x_i - \bar{x}_k)(y_i - \bar{y}_k)}{\sqrt[2]{\sum_{1}^{n}(x_i - \bar{x}_k)^2 \sum_{1}^{n}(y_i - \bar{y}_k)^2}}$$

itself is considered as a component because it is the largest component appearing in the definition of a correlation. A correlation may be calculated based on one or more of its components or combinations of its components. For example, if $SDXY_k = \Sigma_1^n(x_i-\bar{x}_k)(y_i-\bar{y}_k)$, $SSDX_k = \Sigma_1^n(x_i-\bar{x}_k)^2$ and $SSDY_k = \Sigma_1^n(y_i-\bar{y}_k)^2$ are known, the correlation may be calculated; if $$SDXY_k = \sum_{1}^{n}(x_i - \bar{x}_k)(y_i - \bar{y}_k), RSSDX_k = \sqrt{\sum_{1}^{n}(x_i - \bar{x}_k)^2},$$

and $$RSSDY_k = \sqrt{\sum_{1}^{n}(y_i - \bar{y}_k)^2}$$

are known, or if $SDXY_k = \Sigma_1^n(x_i-\bar{x}_k)(y_i-\bar{y}_k)$ and $$RSDXY_k = \sqrt{\sum_{1}^{n}(x_i - \bar{x}_k)^2 \sum_{1}^{n}(y_i - \bar{y}_k)^2}$$

are known, the correlation may also be calculated. If each required component may be decrementally calculated, then the correlation may be decrementally calculated. The number of components to be used varies depending on a specific decremental correlation calculation algorithm chosen. Since multiple components of a correlation and even more combinations of the components exist, there are multiple ways (algorithms) supporting decremental correlation calculation. To illustrate how to use components to decrementally calculate correlation, three different example decremental correlation calculation algorithms are presented as examples later. A new iteration of calculation is started whenever there is a data change in the computation subset. A sum or a mean is the basic component to be used for calculating a correlation. Equation 411 is an equation for directly decrementally calculating a sum $XS_{k+1}$ of all the data elements in the modified computation subset X' in the $k+1^{th}$ iteration. Equation 412 is an equation for directly decrementally calculating a sum $YS_{k+1}$ of all the data elements in the modified computation subset Y' in the $k+1^{th}$ iteration. Equation 413 is an equation for directly decrementally calculating a mean $\bar{x}_{k+1}$ of all the data elements in the modified computation subset X' in the $k+1^{th}$ iteration. Equation 414 is an equation for directly decrementally calculating a mean $\bar{y}_{k+1}$ of all the data elements in the modified computation subset Y' in the $k+1^{th}$ iteration. Either a sum $XS_{k+1}$ or a mean $\bar{x}_{+1}$ and a sum $YS_{k+1}$ or a mean $\bar{y}_{k+1}$ will be used in all three example decremental correlation calculation algorithms described later.

FIG. 4C illustrates the first example decremental correlation calculation algorithm (decremental algorithm 1) for decrementally calculating a correlation. Equation 411 may be used for directly decrementally calculating a sum $XS_{k+1}$ in computation subset X' in the $k+1^{th}$ iteration. Equation 412 may be used for directly decrementally calculating a sum $YS_{k+1}$ in computation subset Y' in the $k+1^{th}$ iteration. Equation 413 may be used for directly decrementally calculating a mean $\bar{x}_{k+1}$ in computation subset X' in the $k+1^{th}$ iteration. Equation 414 may be used for directly decrementally calculating a mean $\bar{y}_{k+1}$ in computation subset Y' in the $k+1^{th}$ iteration. Components $XS_{k+1}$ or $\bar{x}_{+1}$ and $YS_{k+1}$ or $\bar{y}_{k+1}$ are decrementally calculated. Equation 415 is a traditional equation for calculating component $XSS_k$ in computation subset X in the $k^{th}$ iteration. Equation 416 is a traditional equation for calculating component $XSS_{k+1}$ in computation subset X' in the $k+1^{th}$ iteration. Equation 417 may be used for directly decrementally calculating component $XSS_{k+1}$ in computation subset X' in the $k+1^{th}$ iteration if component $XSS_k$ is available. Equations 418 are equations for calculating component $x\sigma_k$ in computation subset X in the $k^{th}$ iteration if components $XSS_k$, $XS_k$ or $\bar{x}_k$ are available. Equations 418 comprise multiple equations but only one of them is needed depending on if a sum or a mean is available. Equations 419 are equations for calculating component $x\sigma_{k+1}$ in computation subset X' in the $k+1^{th}$ iteration if components $XSS_{k+1}$, $XS_{k+1}$ or $\bar{x}_{k+1}$ are available. Equations 419 comprise multiple equations but only one of them is needed depending on if a sum or a mean is available. Equation 420 is a traditional equation for calculating component $YSS_k$ in computation subset Y in the $k^{th}$ iteration. Equation 421 is a traditional equation for calculating component $YSS_{k+1}$ in computation subset Y' in the $k+1^{th}$ iteration. Equation 422 may be used for directly decrementally calculating component $YSS_{k+1}$ in computation subset Y' in the $k+1^{th}$ iteration if component $YSS_k$ is available. Equations 423 may be used for calculating component $y\sigma_k$ in the $k^{th}$ iteration if components $YSS_k$, $YS_k$ or $\bar{y}_k$ are available. Equations 423 comprise multiple equations but only one of them is needed depending on if a sum or a mean is available. Equations 424 are equations for indirectly decrementally calculating component $y\sigma_{k+1}$ in computation subset Y' in the $k+1^{th}$ iteration if components $YSS_{k+1}$, $YS_{k+1}$ or $\bar{y}_{k+1}$ are available. Equations 424 comprise multiple equations but only one of them is needed depending on if a sum or a mean is available. Equation 425 is a traditional equation for calculating component $SXY_k$ in the $k^{th}$ iteration. Equation 426 is a traditional equation for calculating component $SXY_{k+1}$ in the $k+1^{th}$ iteration. Equation 427 may be used for directly decrementally calculating component $SXY_{k+1}$ in the $k+1^{th}$ iteration if component $SXY_k$ is available. Equation 428 may be used for indirectly decrementally calculating correlation $\rho_{k+1}$ if components $XS_{k+1}$ or $\bar{x}_{k+1}$, $YS_{k+1}$ or $\bar{y}_{k+1}$, $SXY_{k+1}$, $x\sigma_{k+1}$, and $y\sigma_{k+1}$ are available. Equations 428 comprise multiple equations but only one of them is needed depending on if a sum or a mean or both are available.

FIG. 4D illustrates the second example decremental correlation calculation algorithm (decremental algorithm 2) for decrementally calculating correlation. Equation 411 may be used for directly decrementally calculating a sum $XS_{k+1}$ in computation subset X' in the $k+1^{th}$ iteration. Equation 412 may be used for directly decrementally calculating a sum $YS_{k+1}$ in computation subset Y' in the $k+1^{th}$ iteration. Equation 413 may be used for directly decrementally calculating a mean $\bar{x}_{k+1}$ in computation subset X' in the $k+1^{th}$ iteration. Equation 414 may be used for directly decrementally calculating a mean $\bar{y}_{k+1}$ in computation subset Y' in the $k+1^{th}$ iteration. Components $XS_{k+1}$ or $\bar{x}_{+1}$ and $YS_{k+1}$ or $\bar{y}_{k+1}$ are decrementally calculated. Equation 429 is a traditional equation for calculating component $SSDX_k$ in computation subset X in the $k^{th}$ iteration. Equation 430 is a traditional equation for calculating component $SSDX_{k+1}$ in computation subset X' in the $k+1^{th}$ iteration. Equations 431 are equations for directly decrementally calculating component $SSDX_{k+1}$ in computation subset X' in the $k+1^{th}$ iteration if components $XS_k$ or $\bar{x}_k$ and $XS_{k+1}$ or $\bar{x}_{k+1}$ and $SSDX_k$ are available. Equations 431 comprise multiple equations but only one of them is needed depending on if a sum or a mean is available. Equation 432 is a traditional equation for calculating component $SSDY_k$ in computation subset Y in the $k^{th}$ iteration. Equation 433 is a traditional equation for calculating component $SSDY_{k+1}$ in computation subset Y' in the $k+1^{th}$ iteration. Equation 434 are equations for directly decrementally calculating component $SSDY_{k+1}$ in computation subset Y' in the $k+1^{th}$ iteration if components $SSDY_k$, $YS_k$ or $\bar{y}_k$ and $YS_{k+1}$ or $\bar{y}_{k+1}$ are available. Equations 434 comprise multiple equations but only one of them is needed depending on if a sum or a mean is available. Equation 435 is a traditional equation for calculating component $SDXY_k$ in the two computation subsets X and Y in the $k^{th}$ iteration. Equation 436 is a traditional equation for calculating component $SDXY_{k+1}$ in the two computation subsets X' and Y' in the $k+1^{th}$ iteration. Equation 437 are equations for directly decrementally calculating component $SDXY_{k+1}$ in the two computation subsets X' and Y' in the $k+1^{th}$ iteration if components $SDXY_k$ with $XS_{k+1}$ or $\bar{x}_{k+1}$ and $YS_{k+1}$ or $\bar{y}_{k+1}$ are available. Equations 437 comprise multiple equations but only one of them is needed depending on if a sum or a mean or both are available. Equation 438 is an equation for decrementally calculating correlation $\rho_{k+1}$ in the $k+1^{th}$ iteration if components $SDXY_{k+1}$, $SSDX_{k+1}$ and $SSDY_{k+1}$ are available.

FIG. 4E illustrates the third example decremental correlation calculation algorithm (decremental algorithm 3) for decrementally calculating correlation. Equation 411 may be used for directly decrementally calculating a sum $XS_{k+1}$ in computation subset X' in the $k+1^{th}$ iteration. Equation 412 may be used for directly decrementally calculating a sum $YS_{k+1}$ in computation subset Y' in the $k+1^{th}$ iteration. Equation 413 may be used for directly decrementally calculating a mean $\bar{x}_{k+1}$ in computation subset X' in the $k+1^{th}$ iteration. Equation 414 may be used for directly decrementally calculating a mean $\bar{y}_{k+1}$ in computation subset Y' in the $k+1^{th}$ iteration. Components $XS_{k+1}$ or $\bar{x}_{+1}$ and $YS_{k+1}$ or $\bar{y}_{k+1}$ are decrementally calculated. Equation 439 is a traditional equation for calculating component $XSS_k$ in the computation subset X in the $k^{th}$ iteration. Equation 440 is a traditional equation for calculating component $XSS_{k+1}$ in the $k+1^{th}$ iteration. Equation 441 is an equation for directly decrementally calculating component $XSS_{k+1}$ in the $k+1^{th}$ iteration if component $XSS_k$ is available. Equation 442 is a traditional equation for calculating component $YSS_k$ in the computation subset Y in the $k^{th}$ iteration. Equation 443 is a traditional equation for calculating component $YSS_{k+1}$ in the $k+1^{th}$ iteration. Equation 444 is an equation for directly decrementally calculating component $YSS_{k+1}$ in the $k+1^{th}$ iteration if component $YSS_k$ is available. Equation 445 is a traditional equation for calculating component $SXY_k$ in the two computation subsets X and Y in the $k^{th}$ iteration. Equation 446 is a traditional equation for calculating component $SXY_{k+1}$ in the $k+1^{th}$ iteration. Equation 447 is an equation for directly decrementally calculating component $SXY_{k+1}$ in the $k+1^{th}$ iteration if component $SXY_k$ is available. Equation 448 are equations for indirectly decrementally calculating correlation $\rho_{k+1}$ in the $k+1^{th}$ iteration if components $XS_{k+1}$ or $\bar{x}_{k+1}$, $YS_{k+1}$ or $\bar{y}_{k+1}$, $XSS_{k+1}$, $YSS_{k+1}$ and $SXY_{k+1}$ are available. Equations 448 comprise multiple equations but only one of them is needed depending on if a sum or a mean or both are available.

To demonstrate decremental correlation calculation algorithms and their comparison against traditional algorithms, three examples are given below. Three pairs of computation subsets of data elements are used. For traditional algorithms, the calculations for all three pairs of computation subsets are exactly the same. For decremental algorithms, initialization of one or more components is performed for the first pair of computation subsets, and decremental calculations are performed for the second and third pairs of computation subsets.

FIG. 5A illustrates an example of calculating a correlation on X Big Data Set 501 and Y Big Data Set 502 using traditional algorithms. X Big Data Set 501 and Y Big Data Set 502 are either a Big Data set or streamed data respectively. X computation subset 503 includes 6 data elements in X Big Data Set 501. Y computation subset 505 includes 6 data elements in Y Big Data Set 502. X computation subset size 504 ($n$) is 6. Y computation subset size 506 ($n$) is 6. Equation 403 may be used for calculating $\bar{x}_1$ and equation 404 may be used for calculating $\bar{y}_1$. Then, $\Sigma_1^6(x_i-\bar{x}_1)(y_i-\bar{y}_1)$, $\Sigma_1^6(x_i-\bar{x}_1)^2$ and $\Sigma_1^6(y_i-\bar{y}_1)^2$ are calculated respectively. Finally, Equation 405 may be used for calculating $\rho_1$. There are a total of 1 square root, 3 divisions, 19 multiplications, 25 additions and 24 subtractions when calculating the correlation on 6 pairs of data elements without any optimization.

The same equations may be used to calculate the correlation for X computation subset 507 and Y computation subset 509 as shown in FIG. 5A Cont'd 1, however the X computation subset size 508 and Y computation subset size 510 are both decreased to 5. Since the sizes of both X and Y computation subsets are decreased by 1 compared to that of the previous X and Y computation subsets, the total number of operations is decreased accordingly. The calculation includes a total of 1 square root, 3 divisions, 16 multiplications, 20 additions, and 20 subtractions when calculating the correlation on 5 pairs of data elements without any optimization.

The same equations may be used to calculate the correlation for X computation subset 511 and Y computation subset 513 as shown in FIG. 5A Cont'd 2. The X computation subset size 512 and Y computation subset size 514 are decreased to 4. Since the sizes of both X and Y computation subsets are decreased by 1 compared to that of the previous X and Y computation subsets, the total number of operations is decreased accordingly. The calculation includes a total of 1 square root, 3 divisions, 13 multiplications, 15 additions, and 16 subtractions when calculating the correlation on 4 pairs of data elements without any optimization. Traditional algorithms for calculating correlation on n pairs of data elements typically take 1 square root, 3 divisions, 3n+1 multiplications, 5(n−1) additions, and 4n subtractions without any optimization.

FIG. 5B illustrates an example of calculating a correlation using decremental algorithm 1. A mean instead of a sum is used in this example. The calculations for X computation subset 503 and Y computation subset 505 use traditional equations for calculating the initial values of the components $\bar{x}_1$, $\bar{y}_1$, $XSS_1$, $YSS_1$ and $SXY_1$. In practice, such calculation will not happen, because decremental correlation calculation would start when both computation subset X and computation subset Y are non-empty and those components have already been calculated. Using traditional algorithms to calculate those components on non-empty computation subsets X and Y here are only for the purpose of illustrating the decremental correlation calculation algorithm. The correlation of X computation subset 503 and Y computation subset 505 are then calculated based on those components. There are a total of 2 square roots, 5 divisions, 24 multiplications, 25 additions and 3 subtractions when calculating the correlation on 6 pairs of data elements without any optimizations.

However, starting from X computation subset 507 and Y computation subset 509, the components of the correlation may be decrementally calculated. The X computation subset size 508 and Y computation subset size 510 are decreased to 5. Equations 413 may be used for decrementally calculating the mean $\bar{x}_2$ and equation 414 may be used for decrementally calculating the mean $\bar{y}_2$. Equation 417 may be used for decrementally calculating the component $XSS_2$ based on component $XSS_1$ previously calculated and removing any contribution of the removed data element $x_r$ mathematically. Equation 422 may be used for decrementally calculating the component $YSS_2$ based on component $YSS_1$ previously calculated and removing any contribution of the removed data element $y_r$ mathematically. Equation 419 may be used for decrementally calculating the component $x\sigma_2$ based on component $XSS_2$ and $\bar{x}_2$ Equation 424 may be used for decrementally calculating the component $y\sigma_2$ based on component $YSS_2$ and $\bar{y}_2$. Equation 427 may be used for decrementally calculating the component $SXY_2$ based on component $SXY_1$ previously calculated and removing any contribution of the removed data elements $x_r$ and $y_r$ mathematically. Finally, equation 428 may be used for calculating the correlation $\rho_2$ based on the components $SXY_2$, $x\sigma_2$, $y\sigma_2$, $\bar{x}_2$ and $\bar{y}_2$. The operations include a total of 2 square roots, 5 divisions, 11 multiplications, and 9 subtractions for decrementally calculating the correlation.

The same equations may also be used for decrementally calculating the components of correlation for X computation subset 511 and Y computation subset 513 from the components of correlation for X computation subset 507 and Y computation subset 509. The X computation subset size 512 and the Y computation subset size 514 are decreased to 4. Although the computation subset size is changed, the number of operations performed by the decremental correlation calculation algorithm remains constant. There are still 2 square roots, 5 divisions, 11 multiplications, and 9 subtractions when decrementally calculating the components of correlation and the correlation. As such, the number of operations used when decrementally calculating the correlation is (potentially substantially) less than when using traditional equations.

FIG. 5C illustrates an example of calculating a correlation using decremental algorithm 2. A mean instead of a sum is used in this example. The calculations for X computation subset 503 and Y computation subset 505 use traditional equations for calculating the initial values of components $\bar{x}_1$, $\bar{y}_1$, $SSDX_1$, $SSDY_1$ and $SDXY_1$ then use $SDXY_1$, $SSDX_1$ and $SSDY_1$ for calculating the correlation $\rho_1$. For example, equation 403 may be used for calculating the mean $\bar{x}_1$ of X computation subset. Equation 404 may be used for calculating the mean $\bar{y}_1$ of Y computation subset. Equation 429 may be used for calculating $SSDX_1$. Equation 432 may be used for calculating $SSDY_1$. Equation 435 may be used for calculating $SDXY_1$. Equation 438 may be used for calculating the correlation $\rho_i$ based on the components $SDXY_1$, $SSDX_1$ and $SSDY_1$. There are a total of operations include 1 square root, 3 divisions, 19 multiplications, 25 additions, and 24 subtractions for calculating the correlation on 6 pairs of data elements without any optimization.

However, starting from X computation subset 507 and Y computation subset 509, the components of the correlation may be decrementally calculated. The X computation subset size 508 and Y computation subset size 510 are decreased to 5. Equations 413 may be used for decrementally calculating the mean $\bar{x}_2$ and equation 414 may be used for decrementally calculating the mean $\bar{y}_2$. Equation 431 may be used for decrementally calculating the component $SSDX_2$ based on components $SSDX_1$, $\bar{x}_2$ and $\bar{x}_1$ previously calculated and removing any contribution of the removed data element $x_r$ mathematically. Equation 434 may be used for decrementally calculating the component $SSDY_2$ based on components $SSDY_1$, $\bar{y}_2$ and $\bar{y}_1$ previously calculated and removing any contribution of the removed data element $y_r$ mathematically. Equation 437 may be used for decrementally calculating the component $SDXY_2$ based on components $SDXY_1$, $\bar{x}_2$ and $\bar{y}_2$ previously calculated and removing any contribution of the removed data elements $x_r$ and $y_r$ mathematically. Equation 438 may be used for calculating the correlation $\rho_2$ based on the components $SDXY_2$, $SSDX_2$ and $SSDY_2$. There are a total of operations include 1 square root, 4 divisions, 7 multiplications, and 12 subtractions for calculating the decremental correlation.

The same equations may also be used for decrementally calculating the components of correlation for X computation subset 511 and Y computation subset 513 from the components of correlation. The X computation subset size 512 and the Y computation subset size 514 are decreased to 4. Although the computation subset size is changed, the number of operations performed by the decremental correlation calculation algorithm remains constant. There are still 1 square root, 4 divisions, 7 multiplications, and 12 subtractions when decrementally calculating the components of correlation and the correlation. As such, the number of operations used when decrementally calculating the correlation is (potentially substantially) less than when using traditional equations.

FIG. 5D illustrates an example of calculating a correlation using decremental algorithm 3. A mean instead of a sum is used in this example. The calculations for X computation subset 503 and Y computation subset 505 use traditional equations for calculating the initial values of components $\bar{x}_1$, $\bar{y}_1$, $XSS_1$, $YSS_1$ and $SXY_1$ and then use these components for calculating the correlation $\rho_1$. For example, equation 403 may be used for calculating the mean $\bar{x}_1$ of X computation subset. Equation 404 may be used for calculating the mean $\bar{y}_1$ of Y computation subset. Equation 439 may be used for calculating $XSS_1$. Equation 442 may be used for calculating $YSS_1$. Equation 445 may be used for calculating $SXY_1$. Finally, equation 448 may be used for calculating the correlation $\rho_1$ based on the components $SXY_1$, $\bar{x}_1$, $\bar{y}_1$, $XSS_1$ and $YSS_1$. There are a total of operations include 1 square root, 3 divisions, 24 multiplications, 25 additions, and 3 subtractions for calculating the correlation on 6 pairs of data elements without any optimization.

However, starting from X computation subset 507 and Y computation subset 509, the components of the correlation may be decrementally calculated. The X computation subset size 508 and Y computation subset size 510 are decreased to 5. Equations 413 may be used for decrementally calculating the mean $\bar{x}_2$ and equation 414 may be used for decrementally calculating the mean $\bar{y}_2$. Equation 441 may be used for decrementally calculating the component $XSS_2$ based on the components $XSS_1$ previously calculated and removing any contribution of the removed data element $x_r$ mathematically. Equation 444 may be used for decrementally calculating the component $YSS_2$ based on the components $YSS_1$ previously calculated and removing any contribution of the removed data element $y_r$ mathematically. Equation 447 may be used for decrementally calculating the component $SXY_2$ based on the components $SXY_1$ previously calculated and removing any contribution of the removed data elements $x_r$ and $y_r$ mathematically. Equation 448 may be used for calculating the correlation $\rho_2$ based on the components $SXY_2$, $\bar{x}_2$, $\bar{y}_2$, $XSS_2$ and $YSS_2$. The operations include a total of 1 square root, 3 divisions, 12 multiplications, and 9 subtractions for calculating the decremental correlation.

The same equations may also be used for decrementally calculating the components of correlation for X computation subset 511 and Y computation subset 513 from the components of correlation. The X computation subset size 512 and the Y computation subset size 514 are decreased to 4. Although the computation subset size is decreased, the number of operations performed by the decremental correlation calculation algorithm remains constant. There are still 1 square root, 3 divisions, 12 multiplications, and 9 subtractions when decrementally calculating the components of correlation and the correlation. As such, the number of operations used when decrementally calculating the correlation is (potentially substantially) less than when using traditional equations.

FIG. 6 illustrates computational loads for traditional correlation algorithms and decremental correlation algorithms for n=4. As depicted, there are fewer multiplication operations, fewer addition operations, and fewer subtraction operations using any one of the decremental algorithms.

FIG. 7 illustrates computational loads for traditional correlation algorithms and decremental correlation algorithms for n=1,000,000. As depicted, there are substantially fewer multiplication operations, fewer addition operations, and fewer subtraction operations using any one of the decremental algorithms.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing-system-implemented method for generating a correlation for data elements in two modified computation subsets, the method comprising:
    initializing, by a computing-device-based computing system, a computation subset size counter n (n≥6) which indicates a number of pairs of data elements in two pre-modified computation subsets of one or two data sets on one or more storage media of the computing-device-based computing system or one or two data streams accessible by the computing-device-based computing system, a sum or an average or both for each of the two pre-modified computation subsets, and one or more other components of a correlation for the two pre-modified computation subsets;
    accessing or receiving, by the computing-device-based computing system, a pair of data elements to be removed from the two pre-modified computation subsets;
    modifying, by the computing-device-based computing system, the two pre-modified computation subsets by:
        removing the accessed or received pair of data elements from the two pre-modified computation subsets; and
        modifying the computation subset size counter;
    decrementally deriving, by the computing-device-based computing system, a sum or an average or both for each of the two modified computation subsets;
    directly decrementally deriving, by the computing-device-based computing system and based at least in part on the one or more components of the correlation other than a sum and an average initialized or derived for the two pre-modified computation subsets and/or the computation subset size counter, one or more components of a correlation other than a sum and an average for the two modified computation subsets, wherein the decrementally deriving includes:
        accessing the one or more components of the correlation other than a sum and an average initialized or derived for the two pre-modified computation subsets without accessing all data elements in the two modified computation subsets to reduce data accessing latency thereby saving computing resources and reducing the computing-device-based computing system's power consumption; and
        removing any contribution of the removed pair of data elements from each of the accessed components mathematically without using all data elements in the two modified computation subsets to reduce the number of operations performed by the computing-device-based computing system thereby increasing calculation efficiency; and
    generating, by the computing-device-based computing system, a correlation for the two modified computation subsets based on one or more of the decrementally derived components.

2. The computing-system-implemented method of claim 1, wherein the generating a correlation further comprises indirectly decrementally deriving, by the computing-device-based computing system, one or more components of the correlation for the two modified computation subsets, wherein the indirectly decrementally deriving the one or more components includes individually calculating each respective one of the one or more components based on one or more components other than the respective one component.

3. The computing-system-implemented method of claim 1, wherein accessing or receiving a pair of data elements to be removed from the two pre-modified computation subsets includes accessing or receiving a plurality of z pairs of data elements to be removed from the two pre-modified computation subsets, and wherein the method further comprises performing, for each pair of the respective z pairs of accessed or received data elements, the modifying the two pre-modified computation subsets, the decrementally deriving a sum or an average or both for each of the two modified computation subsets, the directly decrementally deriving the one or more components for the two modified computation subsets, and the generating a correlation for the two modified computation subsets.

4. The computing-system-implemented method of claim 3, wherein the generating a correlation for the two modified computation subsets comprises generating a correlation for the two modified computation subsets only when the correlation is accessed.

5. The computing-system-implemented method of claim 4, wherein the generating a correlation for the two modified computation subsets further comprises indirectly decrementally deriving, by the computing-device-based computing system, one or more components of the correlation for the two modified computation subsets, wherein the indirectly decrementally deriving the one or more components includes individually calculating each respective one of the one or more components based on one or more components other than the respective one component.

6. The computing-system-implemented method of claim 1, wherein accessing or receiving a pair of data elements to be removed from the two pre-modified computation subsets includes accessing or receiving a plurality of z pairs of data elements to be removed from the two pre-modified computation subsets, and wherein the method further comprises performing, for each pair of the respective z pairs of accessed or received data elements, the modifying the two pre-modified computation subsets, the decrementally deriving a sum or an average or both for each of the two modified computation subsets, and the directly decrementally deriving the one or more components for the two modified computation subsets.

7. The computing-system-implemented method of claim 1, wherein the removing any contribution of the removed pair of data elements from each of the accessed components mathematically without using all data elements in the two modified computation subsets comprises removing any contribution of the removed pair of data elements from each of the accessed components mathematically without using any data element other than the removed pair of data elements.

8. A computing system, the computing system comprising:
one or more computing devices;
each of the one or more computing devices comprising one or more processors;
one or more storage media; and
one or more calculation modules that, when executed by at least one of the one or more computing devices, determine a correlation for two modified computation subsets, the one or more calculation modules configured to:
a. initialize a computation subset size counter n (n≥6) which indicates a number of pairs of data elements in two pre-modified computation subsets of one or two data sets on at least one of the one or more storage media of the computing system or one or two data streams accessible by the computing system, a sum or an average or both for each of the two pre-modified computation subsets, and one or more other components of a correlation for the two pre-modified computation subsets;
b. access or receive a pair of data elements to be removed from the two pre-modified computation sub sets;
c. modify the two pre-modified computation subsets by removing the accessed or received pair of data elements from the two pre-modified computation subsets and updating the computation subset size counter accordingly;
d. decrementally calculate a sum or an average or both for each of the two modified computation sub sets;
e. directly decrementally calculate one or more components of a correlation other than a sum and an average for the two modified computation subsets based at least in part on the one or more components of the correlation other than a sum and an average initialized or calculated for the two pre-modified computation subsets and/or the computation subset size counter, wherein directly decremental calculation of the one or more components includes to remove any contribution of the removed pair of data elements from each of the one or more components mathematically without accessing and using all data elements in the two modified computation subsets to reduce data access latency and the number of operations performed by the computing system, thereby increasing calculation efficiency, saving computing resources and reducing the computing system's power consumption; and
f. generate a correlation for the two modified computation subsets based on one or more of the decrementally calculated components.

9. The computing system of claim 8, wherein the generating a correlation for the two modified computation subsets further comprises to indirectly decrementally calculate one or more components of the correlation for the two modified computation subsets, wherein indirectly decrementally calculating the one or more components includes individually calculating each respective one of the one or more components based on one or more components other than the respective one component.

10. The computing system of claim 8, wherein the one or more calculation modules, when executed by at least one of the one or more computing devices, performing b, c, d, e, and f multiple times.

11. The computing system of claim 10, wherein the performing f comprises generating a correlation for the two modified computation subsets only when the correlation is accessed.

12. The computing system of claim 11, wherein the generating a correlation further comprises indirectly iteratively calculating one or more components of the correlation for the two modified computation subsets, wherein indirectly iteratively calculating the one or more components includes individually calculating each respective one of the one or more components based on one or more components other than the respective one component.

13. The computing system of claim 8, wherein the one or more calculation modules, when executed by at least one of the one or more computing devices, performing b, c, d, and e multiple times.

14. The computing system of claim 8, wherein the without accessing and using all data elements in the two modified computation subsets comprises without using any data element other than the removed pair of data elements.

15. A computing system program product for use at a configured computing system that comprises one or more computing devices and one or more storage media, each computing device comprising one or more processors, the computing system program product comprising one or more non-transitory computing-device-readable storage media having stored thereon computing-device-executable instructions that, when executed by at least one of the one or more computing devices in the configured computing system, cause the configured computing system to perform a method for generating a correlation for data elements in two modified computation subsets, the method including steps to:

initialize, by the configured computing system, a computation subset size counter n (n≥6) which indicates a number of pairs of data elements in two pre-modified computation subsets of one or two data sets on at least one of the one or more storage media of the configured computing system or one or two data streams accessible by the configured computing system, a sum or an average or both for each of the two pre-modified computation subsets, and one or more other components of a correlation for the two pre-modified computation subsets;

access or receive, by the configured computing system, a pair of data elements to be removed from the two pre-modified computation subsets;

modify, by the configured computing system, the two pre-modified computation subsets by removing the accessed or received pair of data elements from the two pre-modified computation subsets and modifying the computation subset size counter;

decrementally calculate, by the configured computing system, a sum or an average or both for each of the two modified computation subsets;

directly decrementally calculate, by the configured computing system, one or more components of a correlation other than a sum and an average for the two modified computation subsets based at least in part on the one or more components of the correlation other than a sum and an average initialized or calculated for the two pre-modified computation subsets and/or the computation subset size counter, including to:

access the one or more components of the correlation other than a sum and an average initialized or calculated for the two pre-modified computation subsets without accessing all data elements in the two modified computation subsets to reduce data accessing latency thereby saving computing resources and reducing the configured computing system's power consumption; and remove any contribution of the removed pair of data elements from each of the accessed components mathematically without using all data elements in the two modified computation subsets to reduce the number of operations performed by the configured computing system thereby increasing calculation efficiency; and generate, by the configured computing system, a correlation for the two modified computation subsets based on one or more of the decrementally calculated components.

16. The computing system program product of claim 15, wherein the generating a correlation further comprises to indirectly decrementally calculate, by the configured computing system, one or more components of the correlation for the two modified computation subsets, wherein indirectly decrementally calculating the one or more components includes individually calculating each respective one of the one or more components based on one or more components other than the respective one component.

17. The computing system program product of claim 15, wherein the computing-device-executable instructions that, when executed, further cause the configured computing system to access or receive a pair of data elements to be removed from the two pre-modified computation subsets, to modify the two pre-modified computation subsets, to decrementally calculate a sum or an average or both for each of the two modified computation subsets, to directly decrementally calculate the one or more components of a correlation other than a sum and an average for the two modified computation subsets, and to generate a correlation for the two modified computation subsets for each pair of multiple pairs of data elements to be accessed or received.

18. The computing system program product of claim 17, wherein the generating a correlation for the two modified computation subsets comprises generating a correlation for the two modified computation subsets only when the correlation is accessed.

19. The computing system program product of claim 18, wherein the generating a correlation for the two modified computation subsets further comprises indirectly iteratively calculating, by the configured computing system, one or more components of the correlation for the two modified computation subsets, wherein indirectly iteratively calculating the one or more components includes individually calculating each respective one of the one or more components based on one or more components other than the respective one component.

20. The computing system program product of claim 15, wherein the computing-device-executable instructions that, when executed, further cause the configured computing system to access or receive a pair of data elements to be removed from the two pre-modified computation subsets, to modify the two pre-modified computation subsets, to decrementally calculate a sum or an average or both for each of the two modified computation subsets, and to directly decrementally calculate one or more components of a correlation other than a sum and an average for the two modified computation subsets for each pair of multiple pairs of data elements to be accessed or received.

* * * * *